Sept. 19, 1939.   P. MANCUSO   2,173,122
METHOD OF AND MEANS FOR APPLYING CLOSURES TO CONTAINERS
Filed May 21, 1937   10 Sheets-Sheet 1
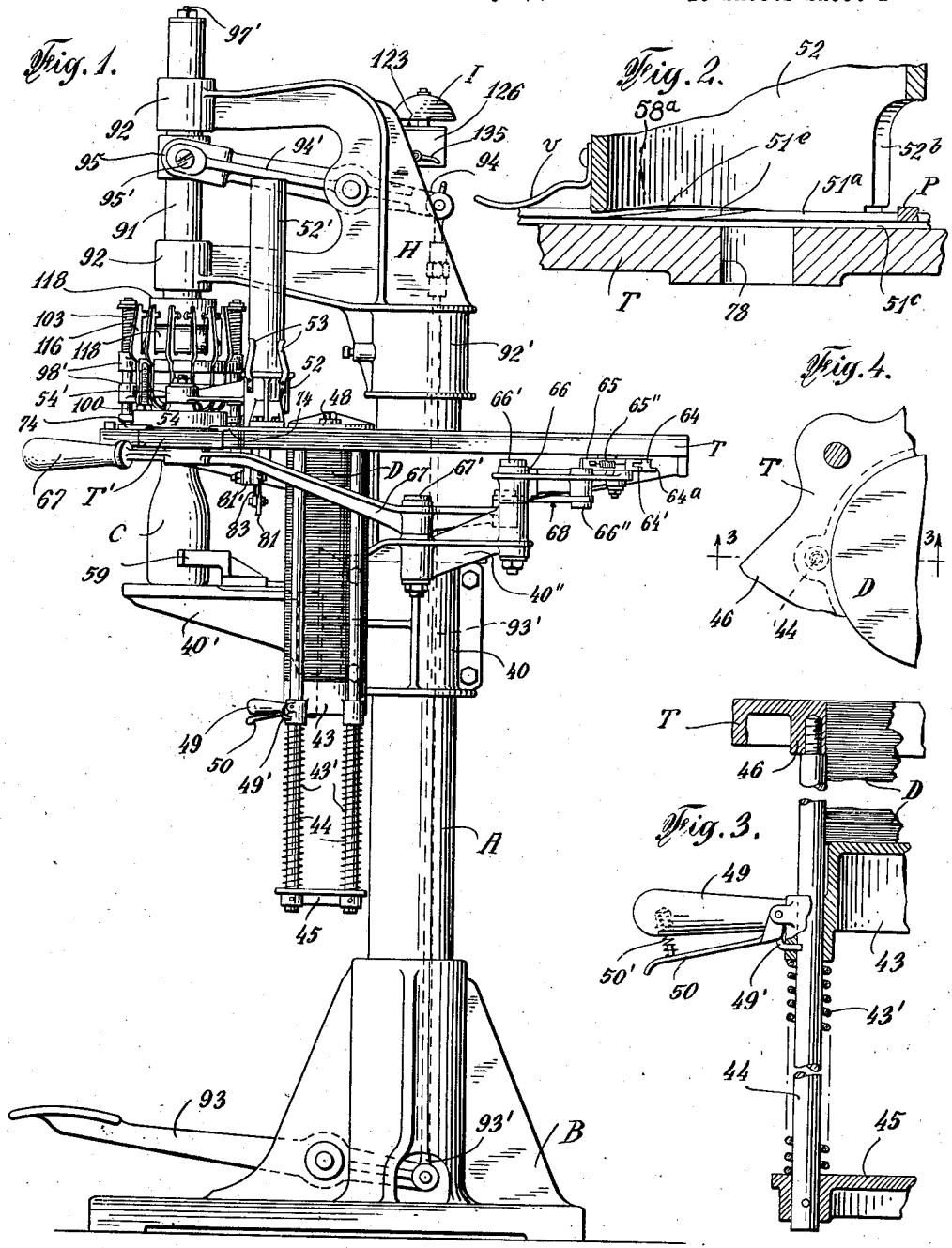
INVENTOR
Philip Mancuso
BY
ATTORNEY

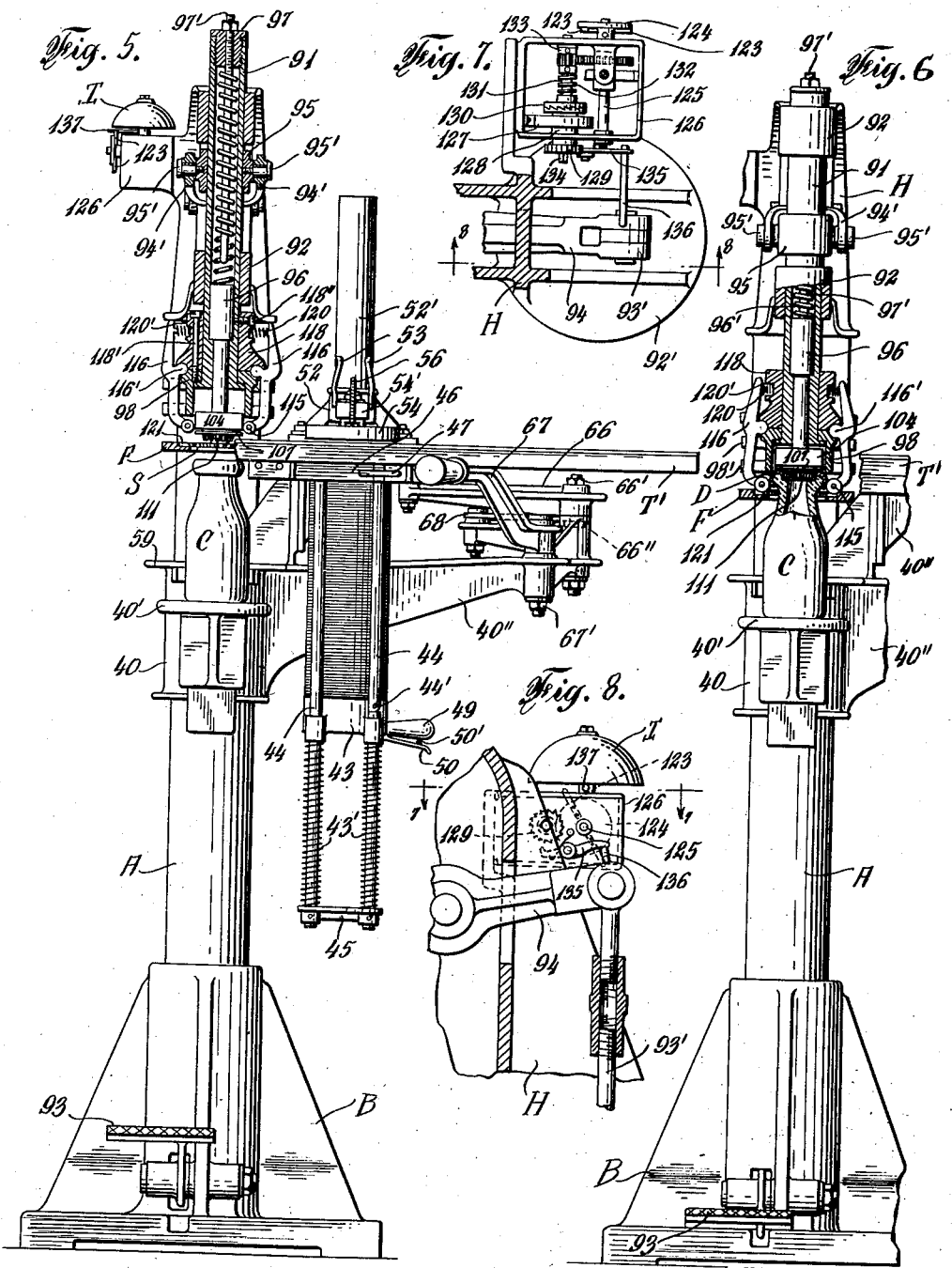

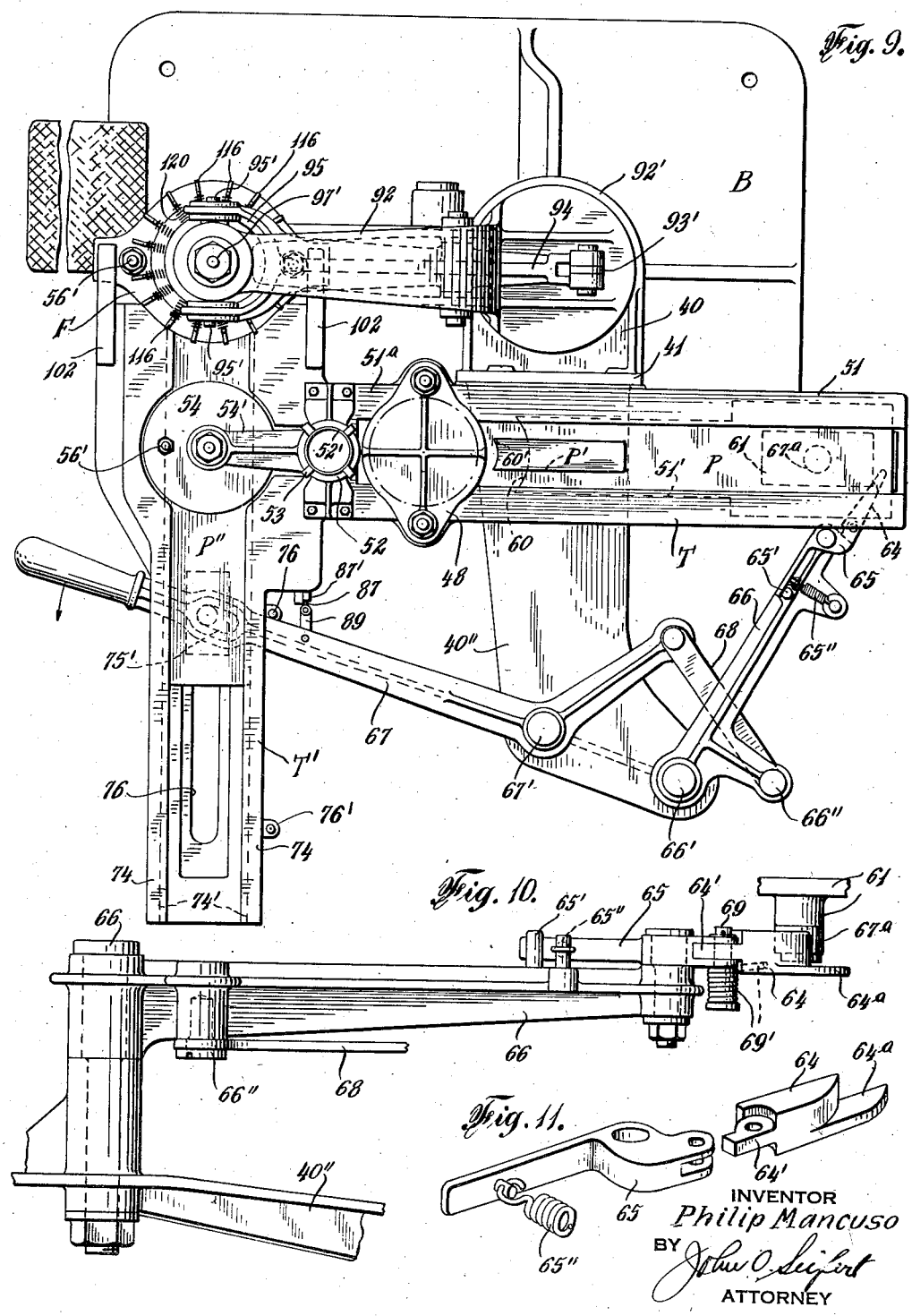

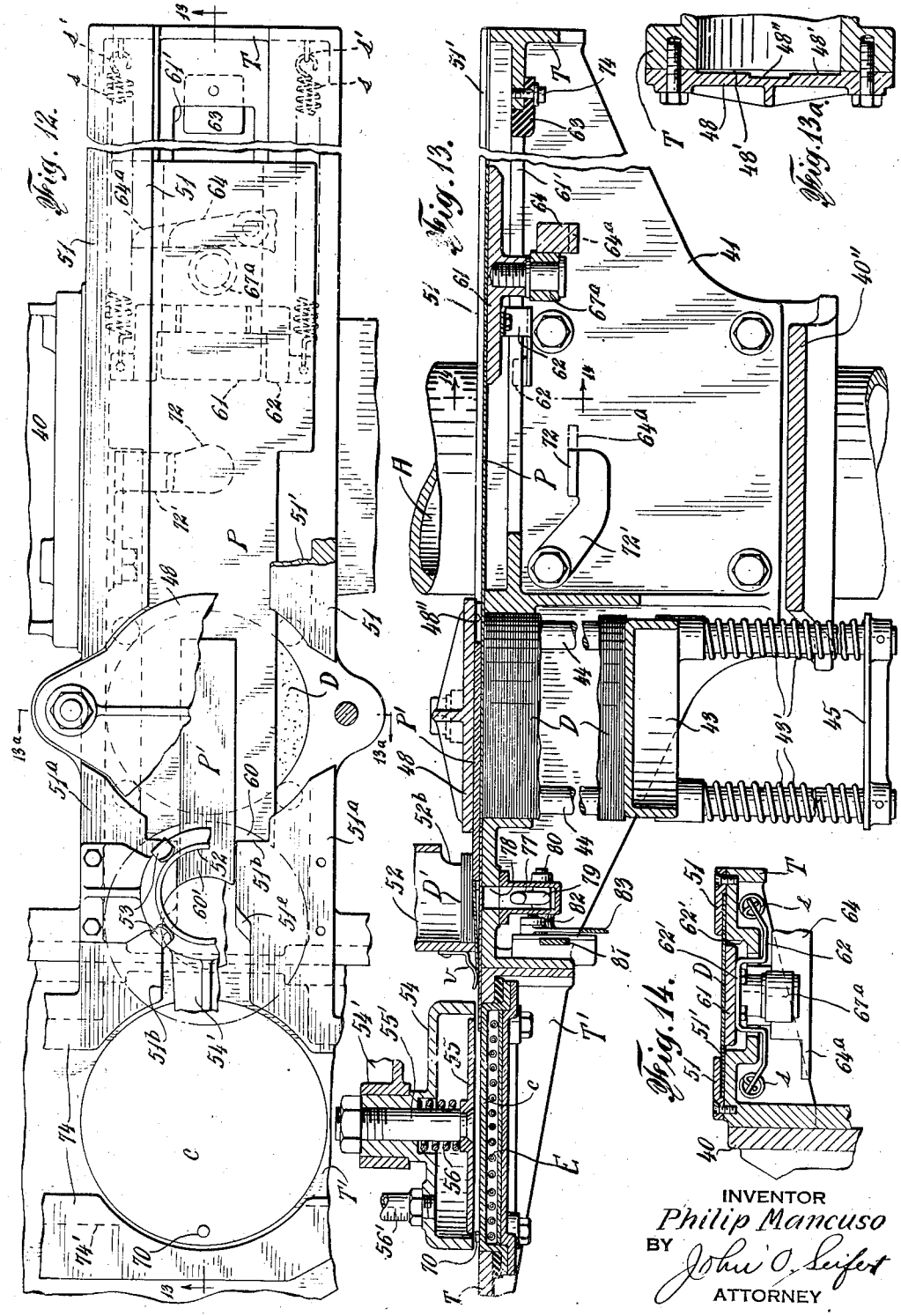

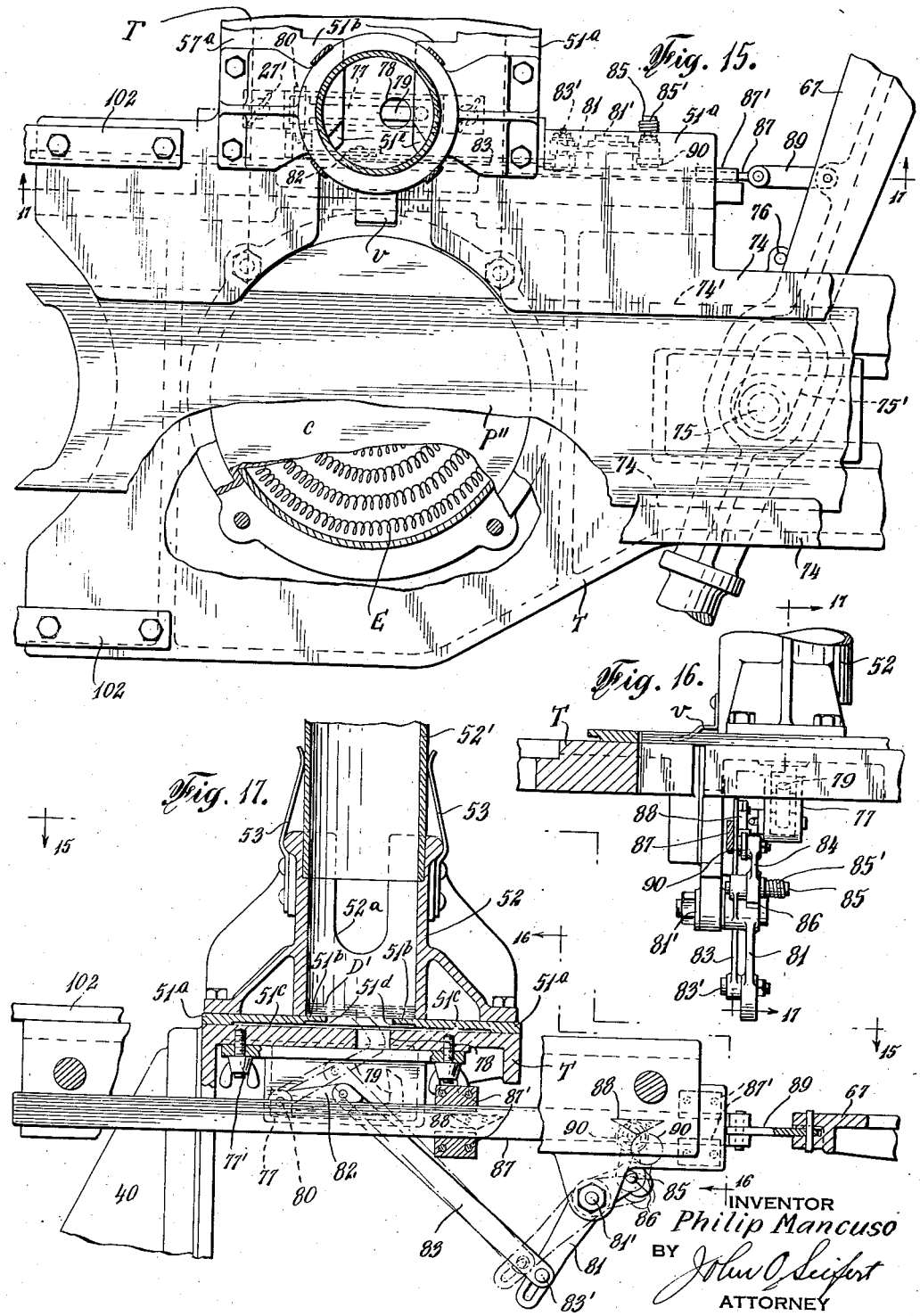

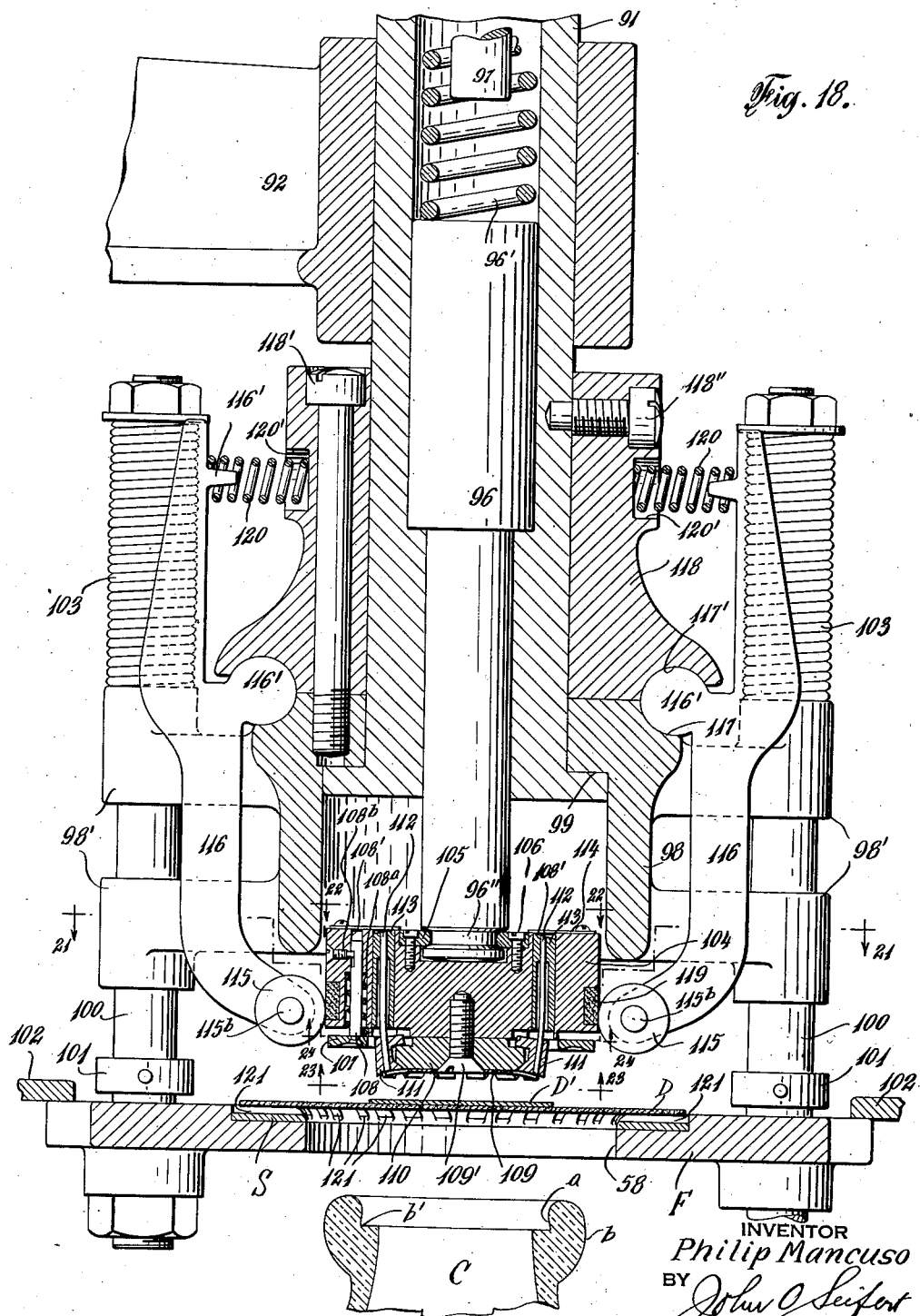

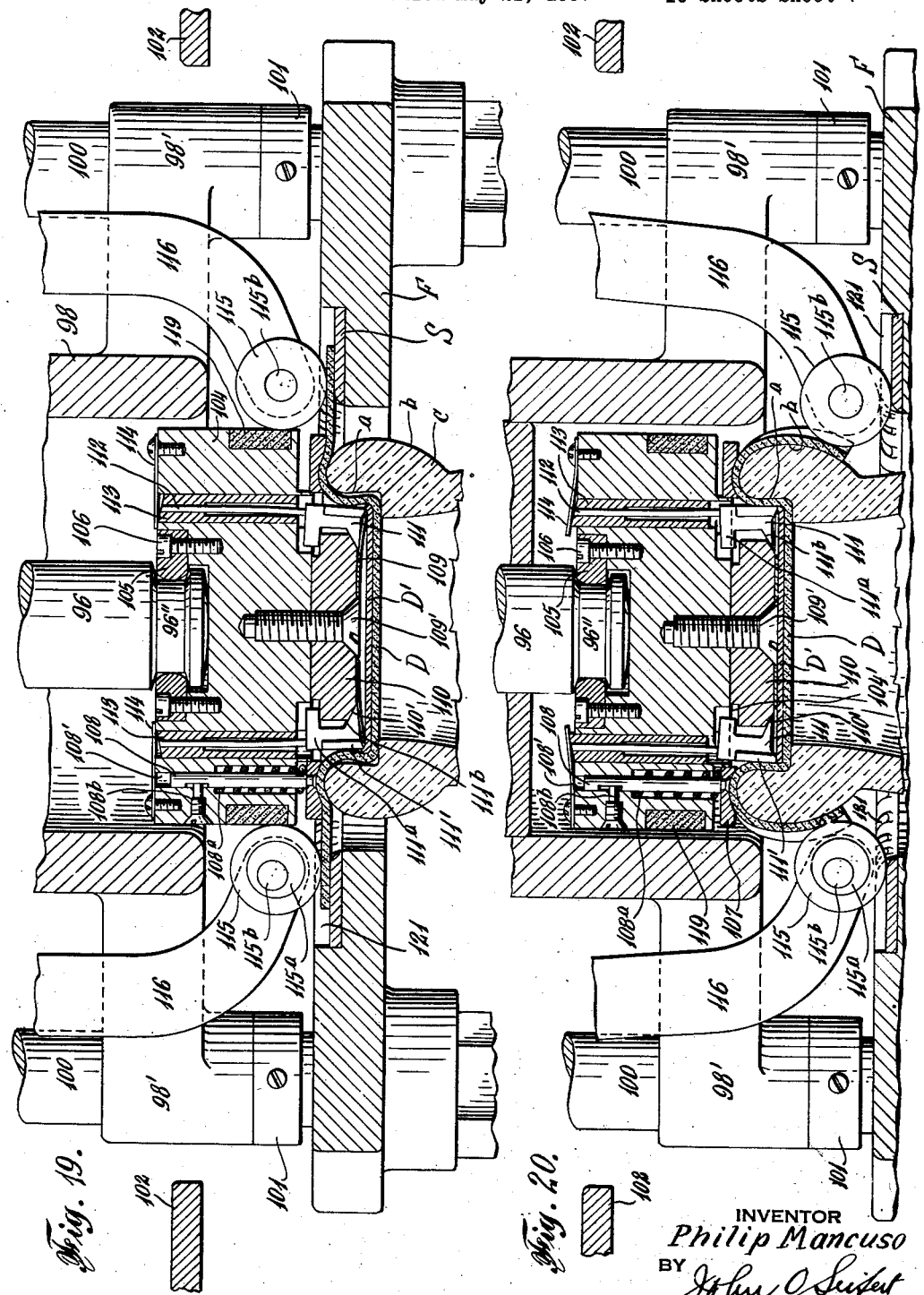

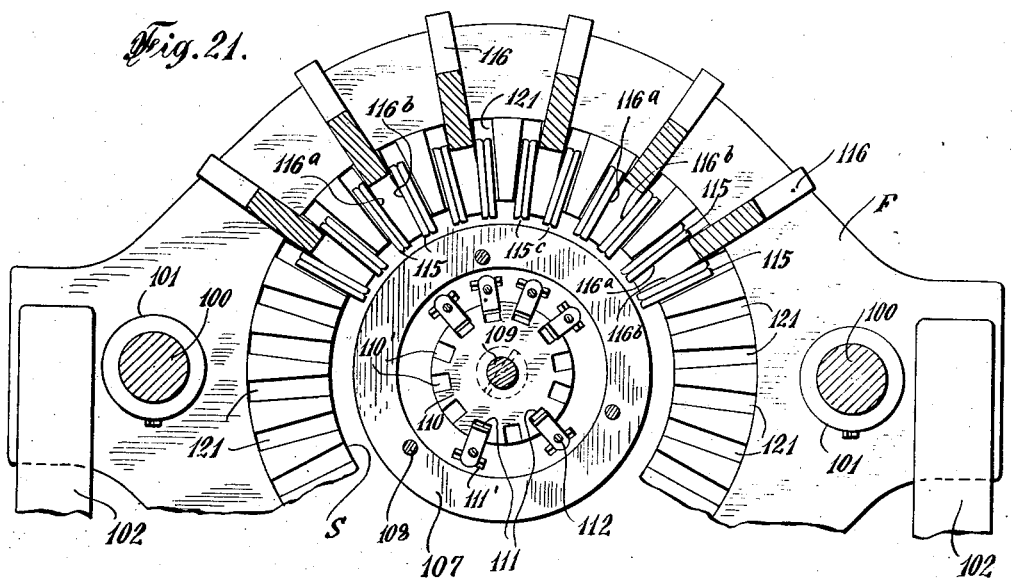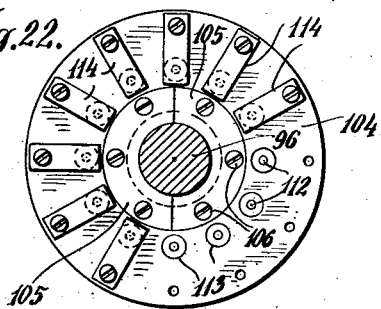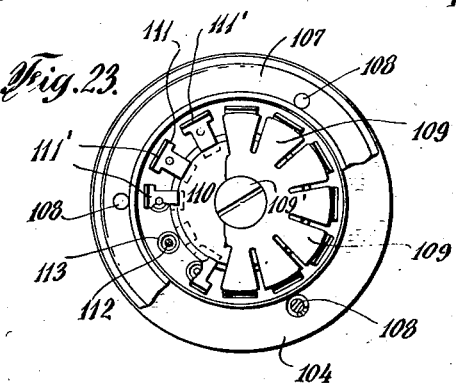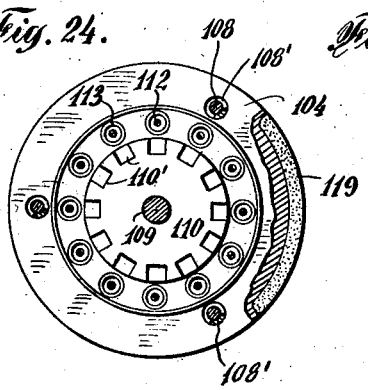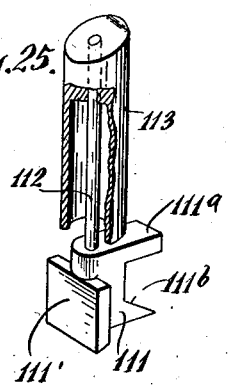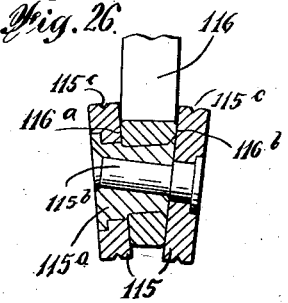
INVENTOR
Philip Mancuso
BY
ATTORNEY Sept. 19, 1939.　　　　P. MANCUSO　　　　2,173,122
METHOD OF AND MEANS FOR APPLYING CLOSURES TO CONTAINERS
Filed May 21, 1937　　10 Sheets-Sheet 9
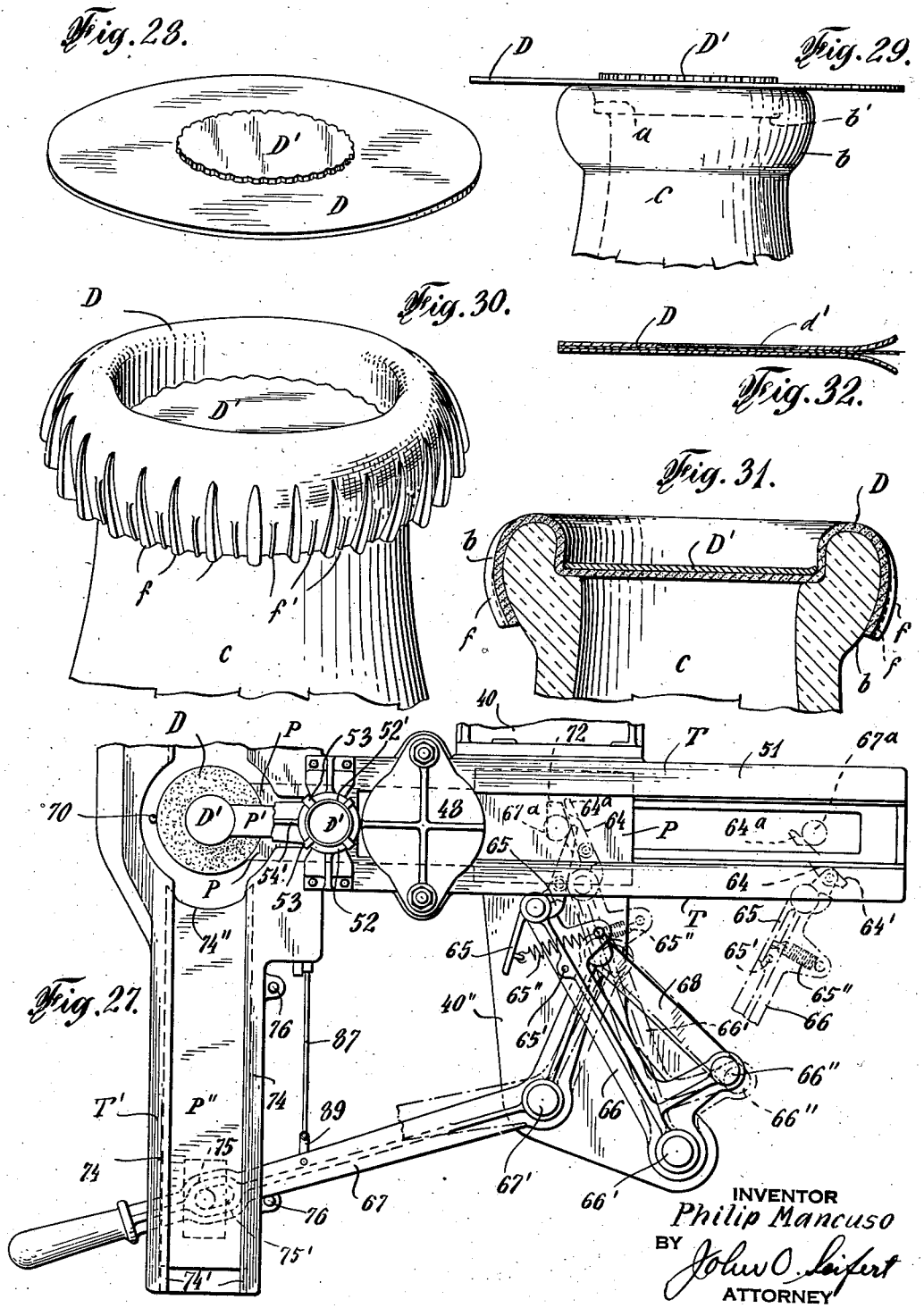
INVENTOR
Philip Mancuso
BY
John O. Seifert
ATTORNEY INVENTOR
Philip Mancuso
BY
ATTORNEY Patented Sept. 19, 1939

2,173,122

UNITED STATES PATENT OFFICE 2,173,122

METHOD OF AND MEANS FOR APPLYING CLOSURES TO CONTAINERS

Philip Mancuso, Brooklyn, N. Y., assignor, by mesne assignments, to Thermo-Plastic Bottle Sealing Corporation, New York, N. Y., a corporation of New York Application May 21, 1937, Serial No. 143,893

36 Claims. (Cl. 226—83)

This invention relates to the applying of sealing closures of fibrous and like material to containers, and while the invention is applicable to the applying of closures to containers of various kinds requiring sealing the contents therein, it is particularly applicable for the applying of closures to containers, such as glass or paper, for distributing milk and like dairy products wherein the wall of the neck about the container mouth diverges inwardly to progressively increase the area of the neck opening.

The closure comprises a disk consisting of multiple plies of fibrous material united or bonded together by a thermoplastic adhesive material whereby at normal atmospheric temperature the material of the disk is substantially rigid and when subjected to an elevated temperature is adapted to be rendered pliable and moldable and capable of being molded or shaped to desired form and in which condition the disk is shaped to cap form upon the container neck with a central disk portion depressed inwardly to be engaged within the mouth of the container and the portion of the disk outwardly from and bounding the depressed portion curved outwardly to engage over the lip about the container mouth and then extended downwardly to constitute the skirt of the closure cap, which skirt is curved inwardly and simultaneously fitted snugly about the container by displacing the surplus material of the skirt by folding successive portions thereof inwardly upon themselves and arranging the cap skirt with outwardly projecting fins that also function to render the cap skirt resiliently expansible within predetermined limits and yieldingly urge and retain the cap skirt to the container.

It is an object of the invention to provide improved means for molding or shaping a disk of this character to a closure cap about and seal the mouth of a container.

It is a further object of the invention to provide an improved method of and means for providing the disk of moldable material from which a closure cap of this character is formed with a reinforcement member in the form of a disk of substantially rigid though somewhat flexible fibrous material concentrically thereof, which reinforcement member is engaged within the container mouth simultaneously with the inwardly depressing of the central portion of the disk of moldable material and engaging said depressed portion within the container mouth to arrange the closure as a combined plug and cap closure means for the container opening and interlock said reinforcement member with the material of the closure cap and lock the closure cap to and in conjunction therewith provide a liquid tight seal between the closure means and the container.

It is another object of the invention to provide a disk of fibrous material having the properties of being substantially rigid at atmospheric temperature and adapted when subjected to an elevated temperature to be rendered moldable to be molded or shaped to cap formed about a container mouth with a central portion depressed inwardly and engaged within the container mouth and to combine with said disk centrally thereof a disk of less diameter and of substantially rigid though somewhat flexible material and co-operate with the depressed portion of the disk of moldable material to adapt the closure cap to function as a combined cap and plug closure means for a container, and to provide means operative in successive sequence to assemble the disks one concentrically of the other, deliver the assembled disks to a zone of elevated temperature to render the one disk pliable and moldable, and then present the assembled disks to means to mold and shape the one disk about the container mouth, interlock the disks and lock the closure means to the container to provide a liquid tight seal and substantially air tight seal between the closure means and container.

In the applying of closure means to a container by molding a disk of material about the container mouth it is essential that the molded and shaped disk be retained in its shaped condition for a sufficient length of time to permit setting of the thermoplastic adhesive material bonding the plies of the material of the disk together and thus retain the material in its shaped form, and it is a further object of the invention to provide time controlled alarm or signalling means adapted to be set in operation by and at the commencement of operation of the molding and forming means to render the alarm or signalling means active after a predetermined period of time to indicate the closure applying means has been retained in position with the closure in its molded condition for a sufficient period of time to permit the thermoplastic adhesive material to set and harden and that said means may be moved out of molding position.

While the invention is applicable for applying closures to containers of various forms it is particularly adapted for applying closures to containers, such as milk bottles, wherein the inner surface of the wall about the container mouth diverges slightly inwardly.

In carrying out the invention there is provided a disk of the pliable and moldable material of a diameter that depends upon the extent to which the central portion of the disk is to be depressed inwardly and as much of the portion of the disk outwardly from the depressed portion it is desired to engage about the container neck, the disk comprising laminations of suitable fibrous material united or bonded together by a suitable thermoplastic adhesive material, whereby the disk is substantially rigid at normal atmospheric temperature and adapted to be rendered pliable and moldable to desired shape when subjected to an elevated temperature, and when cooled retained in its molded condition. A disk of substantially rigid though somewhat flexible material and of a diameter less than the diameter of the first disk and having projections spaced about the periphery circumscribing a circle having a diameter greater than the diameter of the mouth of the container is arranged concentrically of the disk of larger diameter. A supporting structure for the operative parts is provided including a table with means to support below the table a stack of the disks of larger diameter, and means are provided to urge said stack of disks upwardly to position the uppermost disk in predetermined position above the table. Means to support a stack of the disks of smaller diameter above the table are arranged in spaced and alined relation to the support for the first stack of disks, and heating means to produce a zone of elevated temperature are arranged in successive spaced relation to the support for the second stack of disks. While it is not essential means are provided to supply an adhesive material to the lowermost disk of the stack of disks of smaller diameter supported above the table. In alined and angular relation to the heating means there is arranged a support for a container and means supported in superposed relation thereto to mold or shape the disk of moldable material to inwardly depress a central portion of said disk with the juxtaposed disk of smaller diameter into the mouth of the container, the engaging of the disk of smaller diameter into the mouth of the container buckling the peripheral portion thereof and in successive sequence flattening said buckled peripheral portion and causing the peripheral projections to engage and be interlocked with the material of the other disk bounding the depressed portion and lock the closure to the container and provide a liquid tight seal, and then mold the portion of the disk of moldable material outwardly from the depressed portion about the container mouth. Means are also provided to feed in successive sequence the uppermost disk from the stack of disks of moldable material relative to the stack of disks of smaller diameter and deliver the lowermost disk from said second stack of disks therefrom and assemble the same concentrically of the first disk, deliver the assembled disks to the heating means to render the one disk pliable and moldable, and then deliver the disks to means to apply the disks as a sealing closure means to the mouth of the container and simultaneously therewith apply adhesive to the lowermost disk of the stack of disks of smaller diameter.

In the drawings accompanying and forming a part of this application Figure 1 is a side elevation of apparatus embodying the invention.

Figure 2 is a sectional detail view of the lower portion of a magazine for a stack of disks supported above the table to show the means to support the disks relative to the table and permit feeding the lowermost disk from the stack.

Figure 3 is a detail view in section taken substantially on the line 3—3 of Figure 4 looking in the direction of the arrows and showing the means for supporting a stack of disks below the table and the means to urge the stack of disks upwardly.

Figure 4 is a view looking at the top of Figure 3.

Figure 5 is a front elevation of the apparatus showing the means to mold and shape the closure to a container mouth in section.

Figure 6 is a view similar to Figure 5 but showing the means to mold and shape the closure in closure shaping position.

Figure 7 is a detail view of the alarm or signalling means taken substantially on the line 7—7 of Figure 8 looking in the direction of the arrows.

Figure 8 is a sectional view taken substantially on the line 8—8 of Figure 7 looking in the direction of the arrows.

Figure 9 is a plan view of the apparatus looking at the top of Figure 1 and showing the parts in normal position.

Figure 10 is a side elevation of the disk feeding means.

Figure 11 is a perspective view disassembled of a portion of the disk feeding means.

Figure 12 is a plan view, partly broken away, to show the arrangement of the supports for the stacked disks and the heating means and showing the disk feeding means in relation thereto.

Figure 13 is a sectional view taken substantially on the line 13—13 of Figure 12 looking in the direction of the arrows.

Figure 33:
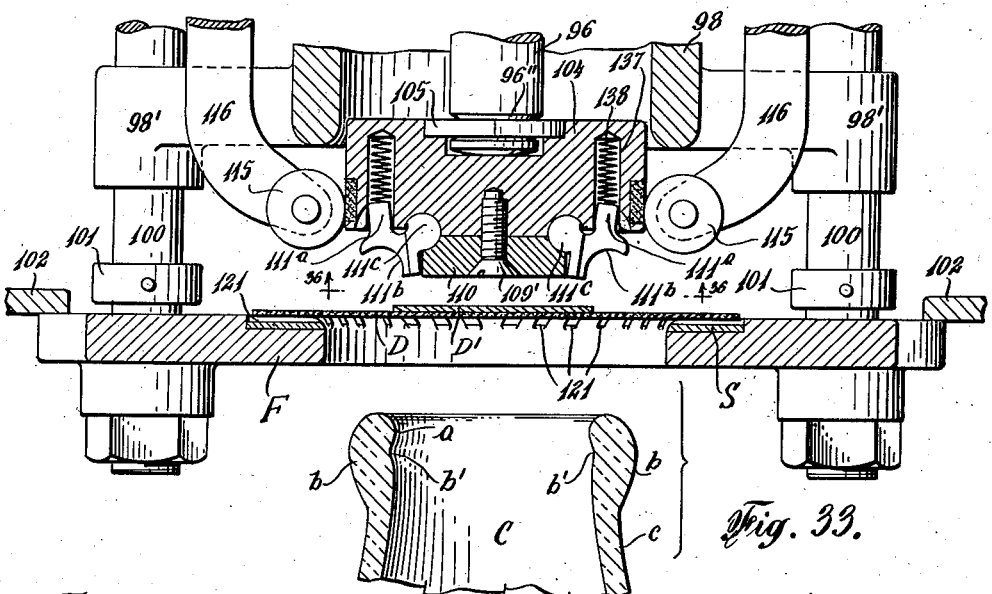

Figure 13ª is a sectional view taken substantially on the line 13ª—13ª of Figure 13 looking in the direction of the arrows.

Figure 14 is a sectional view taken substantially on the line 14—14 of Figure 13 looking in the direction of the arrows.

Figure 15 is a sectional view taken substantially on the line 15—15 of Figure 17 looking in the direction of the arrows to show the relation of the heating means to the supporting means for the stack of disks superposed to the table and showing in dotted lines the actuating means for the means to apply adhesive to the lowermost disk of the stack.

Figure 16 is a view taken on the line 16—16 of Figure 17 looking in the direction of the arrows and showing in front elevation the actuating means for the means to apply adhesive to the lowermost disk of the stack of disks superposed to the table.

Figure 17 is a sectional view taken substantially on the line 17—17 of Figure 16 looking in the direction of the arrows and showing the adhesive applying means.

Figure 18 a longitudinal sectional view of the means for molding or shaping the one disk to closure cap form about the mouth of a container and showing the parts in normal position.

Figure 19 is a sectional view, on an enlarged scale, of the means for molding or shaping the one disk to cap form and showing the parts in the initial position of molding or shaping the disk about the mouth of a container.

Figure 20 is a view similar to Figure 19 but showing the parts in position with the disk molded and shaped about the container mouth.

Figure 21 is a cross sectional view, on an enlarged scale and partly broken away, taken on the line 21—21 of Figure 18 looking in the direction of the arrows.

Figure 22 is a cross sectional view taken substantially on the line 22—22 of Figure 18 looking in the direction of the arrows.

Figure 23 is a cross sectional view taken substantially on the line 23—23 of Figure 18 looking in the direction of the arrows.

Figure 24 is a cross sectional view taken substantially on the line 24—24 of Figure 18 looking in the direction of the arrows.

Figure 25 is a detail view in perspective and partly in section of the means to interlock the disk plug with the cap of the closure means and lock the cap in liquid tight connection to the bottle.

Figure 26 is a sectional detail view of the means to fold or crimp the surplus material of the cap skirt to snugly fit the same to the bottle neck.

Figure 27 is a view similar to Figure 9 but showing the feeding means in position with the assembled disks fed to the heating means and zone of elevated temperature.

Figure 28 is a perspective view of the assembled disks from which the closure is formed.

Figure 29 is a side elevation showing the assembled disks positioned relative to the mouth of a bottle preparatory to shaping the same to a closure about the bottle mouth.

Figure 30 is a perspective view of the neck portion of a bottle with the closure applied thereto.

Figure 31 is a sectional view taken substantially centrally through the cap on a bottle mouth.

Figure 32 is a side elevation showing a modified structure of the disk of larger diameter.

Figure 34:
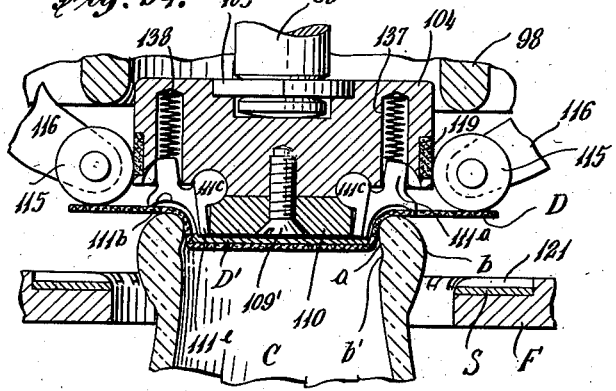
Figures 35, 37:
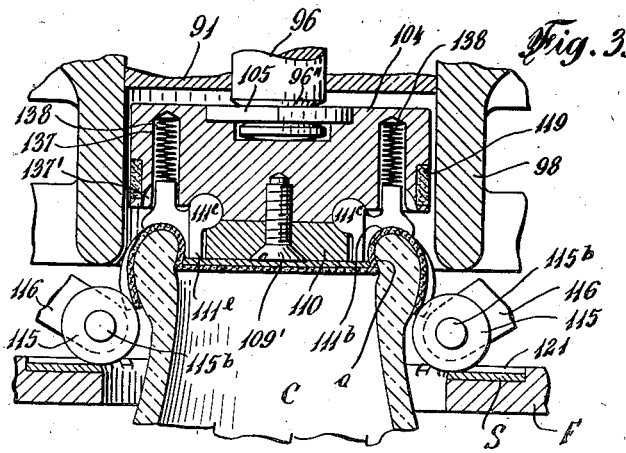

Figures 33, 34 and 35 are views similar to Figures 18, 19 and 20 respectively, but showing modified means for depressing inwardly the central portion of the one closure disk and the means to interlock the disk plug with the depressed portion of the other disk.

Figure 36:
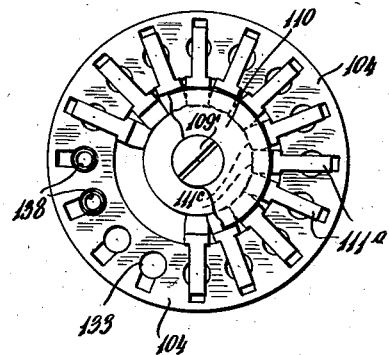

Figure 36 is a view taken substantially on the line 36—36 of Figure 33 looking in the direction of the arrow; and Figure 37 is a detail view in perspective of a shoe to clamp a disk to and shape it to the inner surface of the wall about a container mouth of the modified means of Figures 33, 34 and 35 for molding and shaping a disk to cap form on the mouth of a container.

While the closure means is adapted to be applied particularly to containers, as C, having filler openings and pouring mouths of various forms, it is particularly adapted to be applied to bottles wherein the inner surface of the wall about the mouth diverges inwardly, as shown at *a* in Figures 18 and 33, with a bead *b* of arcuate form in cross section disposed about the mouth. The closure is constructed and arranged of a pair of disks D, D' of fibrous material. The disk D has the property of being substantially rigid at normal atmospheric temperature and adapted to be rendered pliable and moldable when subjected to an elevated temperature and adapt the disk to be molded and shaped to desired form about the mouth and neck of a container, for which purpose it is constructed of multiple plies, in the present instance three in number as shown in Figure 32, united or bonded together by a suitable thermoplastic adhesive materials having the property of being rendered viscous and to set and harden when subjected to an elevated temperature and when set retain the plies of fibrous material of the disk in molded or shaped form. The disk D' is of relatively stiff fibrous material though somewhat yielding and arranged with peripheral projections circumscribing a circle having a diameter somewhat larger than the diameter of the mouth at the entrance thereto in the neck of the container.

In the embodiment of the invention illustrated in Figures 1 to 32, inclusive, of the drawings there is provided a base B and in a tubular portion of which base there is mounted a hollow pedestal A upon which the supporting means for the operative parts of the apparatus are mounted and supported. A bracket 40 mounted on the pedestal A to have longitudinal adjustment thereon and about the same carries a table having a portion T and a portion T' extending in angular relation to and at one end of the table portion T the table being fixed at the portion T to the bracket 40 by screws extended through openings in a portion 41 extending downwardly from the table and the screws threaded into the bracket 40, as shown in Figures 1, 9 and 15. Mounted on and suspended below the table portion T is a support 43 for a stack of the disks D, the support or carrier 43 being slidably mounted on a series of posts 44, shown as four in number, three of the posts being fixed at one end in a head 45 and the opposite ends screw threaded into an annular portion 46 extending downwardly from the bottom of the table portion T, as shown in Figure 3. The other one of said posts consists of a pair of pivotally connected sections, one section being fixed in the head 45 and the other section adapted to releasably engage a recess in the annular portion 46 bounding an opening in the table for the passage of the stacked disks D and releasably retained in said recess by a pivoted latch as shown at 47 in Figure 5, the making of the one post of pivoted sections being for the purpose of permitting stacking of the disks D on the support between the posts and retaining the disks in stacked formation between the posts. The head with the stack of disks D thereon is urged upwardly to position with the uppermost disk above the table portion T in engagement with undercut face portions 48' of an abutment member 48 mounted on the table with the faces 48' spaced from the table a distance substantially equal to the thickness of the disks D. The undercut portions of the member 48 constitute continuations of guideways formed at the opposite sides and above the table by undercutting the under face of plates 51 fixed upon and extending longitudinally of the opposite sides of the table, as at 51', said guideways being for a purpose hereinafter described. To facilitate engaging disks on the support 43 it is provided with a laterally extending hand grip 49 pivotally carrying a detent urged in a direction toward and adapted to engage an opening in a post 44, and shown as an angular member or pin 49' fixed to a lever 50 pivotally supported on the hand grip, the detent pin extending in a direction opposite to the lever and urged toward the post by a spring 50' so that the detent pin will engage the opening or socket in the post when the pin comes opposite the opening in a lower position of the support 43, as shown in Figure 3. After the disks have been engaged on the support 43 the detent pin 49' is released from the post opening or socket by the lever 50 when the support 43 with the disks stacked thereon is urged upwardly with the uppermost disk in engagement with the faces 48' of the abutment 48 by springs 43' coiled about the posts 44 between the ears of the support 43 whereby it is mounted on the posts and the head 45.

Mounted above the table portion T in successive spaced relation and alinement with the disk support 43 and at the juncture of the table portion T with the portion T' of the table is a magazine for a stack of the disks D', comprising a member 52 (Figure 17) fixed in superposed relation to inwardly extending portions 51$^b$ of plates 51$^a$ having an undercut portion 51$^c$ in the under face to constitute a continuation of the undercut faces 48' of the abutment 48 and guideways 51', said plates 51$^a$ having a further undercut portion 51$^d$ at the extremities thereof, as shown in Figure 17. In an enlargement of the tubular portion of the member 52 there is engaged and supported a tube 52' having an internal diameter the same as the internal diameter of the tubular portion of the magazine member 52, the tube 52' being held against canting movement by spring fingers 53 fixed to the tubular portion 52 to extend upwardly therefrom and embrace the tube 52'. To support the disks D' in the tube 52' by the finger during the engaging of the tube 52' in the tubular portion 52 the latter is provided with a cutout 52$^a$ for the passage of the finger. The tubular portion 52 may also be provided with a cutout finger engaging portion 52$^b$, as shown in Figures 2 and 13, to straighten the disks should they be canted in said tubular portion 52 of the magazine.

An electric heating element, shown in a general way at E, is mounted in a circular enclosing and carrying casing c therefor, and is mounted thereby in an opening and insulated from the table portion T' in successive spaced relation to and in alinement with the disk supporting magazine 52 with the top of the enclosing casing c for the heating element constituting a hot plate extending in the plane of the top of the table, as shown in Figure 13, the heating element providing a zone of elevated temperature to which the disks D are subjected to render the thermoplastic adhesive material thereof viscous and the disk pliable and moldable. Suitable means are provided (not shown) to regulate the connection of the heating element with a source of electric energy and thereby control and regulate the temperature of the zone of elevated temperature.

A hood 54 is carried and supported in superposed relation to the heating element by an arm 54' extended from the base portion of the magazine member 52. A plate 55 is carried within the hood by a stem 55' fixed centrally in the plate and slidably engaging a boss extended centrally from and whereby the hood is mounted in the arm 54', the plate 55 being urged to predetermined position in spaced relation to the top of the enclosing casing for the heating element by a spring 56, the purpose of the plate being to prevent dissipation of the heat. A temperature responsive and temperature indicating device may be provided to indicate the temperature of the zone of elevated temperature, and is shown in a conventional manner as a thermometer at 56' mounted on the hood 54. Mounted on the table portion T' in angular relation to and in alinement with the heating element E is an annular disk support and die S the support being recessed into the face of and concentric with an opening in a plate F constituting a part of the disk molding and shaping means, indicated in a general way by M, and superposed to a support 40' extended laterally from the bracket 40 for the container or bottle C positioned on the support 40' relative to a gauge 59 to aline the container or bottle axially of the support S and to which container or bottle the closure is to be applied.

Means are provided to successively feed the disks D from the stack on the support 43, feed disks D' from the bottom of the stack in the magazine 52, 52' and assemble said latter disks D' in superposed concentric relation to the disks D, and feed the assembled disks into superposed relation to the enclosing casing c for the heating element E. This means is shown as comprising a plate P having a portion of increased width at the rear end as viewed in Figures 9, 12 and 27, the side marginal portions of which portion of the plate P slidably engage in the guideways 51' of the plates 51, as clearly shown in Figure 14, to have reciprocatory movement in the plane of the uppermost disk of the stack of disks D engaging the undercut faces 48' of the abutment 48. The front edge 60 of the plate is in an arc of a circle having a radius equal to the radius of the disks D, the plate P constituting a feed plate for the disks D. An auxiliary feeder plate P' for feeding the disks D' from the magazine 52, 52' is mounted on and superposed to the feeder plate P with the forward end projecting beyond the end 60 of the feeder plate P, as shown in Figures 9, 12 and 13, and the forward edge arranged in an arc of a circle having a radius equal to the radius of the disks D'. The disk feeding plates P, P' are carried by a head 61 secured to the under surface of the plate P and arranged in a longitudinal recess 61' in the top of the table portion T with a boss extended downwardly from the head through a slot in the recessed portion 61' of the table, as shown in Figure 14. The plates are urged in a direction toward the right as viewed in Figures 9, 12 and 13 by springs s arranged at opposite sides of the recessed portion 61' of the table, the springs being attached at one end to the table, as at s' (Figure 12) and attached at the opposite ends to the opposite ends of a number 62 extending transversely of the table T and secured by screws at an intermediate offset portion extended through the slot in the recessed portion 61' of the table to the head 61, as shown at 62' in Figure 14.

The feeder slides or plates P, P' are normally positioned by the springs s with the boss of the slide carrying head 61 engaging a bumper 63 of cushioning material fixed to the table and abutting the end wall of the slot in the bottom wall of the recessed portion 61' of the table. Feeding movement is imparted to the feeder slides or plates P, P' in a direction toward the left as viewed in Figures 9, 12, 13 and 27, by a pawl 64 pivotally carried at one end of an arm of a lever 65 pivotally carried at one end of an arm 66 pivotally mounted on a stud 66' fixed in an arm 40'' extended laterally from the bracket 40 below the table portion T in the direction of the portion T' of the table, the lever 65 being normally urged to position to extend in the direction of and from the end of the arm 66 in engagement with a pin 65' fixed in and extended from the arm 66 by a spring 65'' attached at one end to the lever 65 and at the opposite end to a pin fixed in arm 66. The pawl 64 engages at the rear of a roller 67$^a$ rotatably carried on a stud fixed in the boss of the feeder slide carrying head 61, as shown in Figure 13. The arm 66 is rocked or oscillated by a manually operative lever 67 pivotally mounted on a stud 67' fixed in the bracket arm 40'', which lever is arranged at one end with a hand grip. The lever 67 is connected to the arm 66 by a link 68 pivotally connected at one end to the other arm of lever 67 and the opposite end connected to the arm 66, as at 66''. The pawl 64 is pivotally connected to the lever 65 by a reduced portion 64' extended from one end of the pawl engaging a bifurcation at the end of one arm of the lever 65 and a headed pin 69 extended through perforations in the bifurcation legs and said reduced portion 64' of the pawl. The pawl 64 is urged to position to extend outwardly from the lever 65 by a spring 69' coiled about the pivot pin 69 and confined between the head of said pivot pin and the bifurcated end of the lever 65 and the spring connected to the pawl and lever whereby the pawl under the tension of the spring is urged to the position shown in Figure 9, and such movement of the pawl limited by the flat end of the reduced pawl portion 64' abutting the end wall of the bifurcation of the lever 65.

The parts to actuate the feeder slides P, P' operated by the manually operative lever 67 are shown in normal position in Figure 9. By moving the lever 67 in the direction indicated by the arrow in Figure 9 to the position shown in Figure 27 the pawl 64 by the engagement thereof with the roller 67ª mounted on the feeder slide carrying head 61 will move the feeder slides to the left from the position shown in Figure 9 to that shown in Figure 27, the slide P engaging and delivering the uppermost disk D of said stack of disks, and the auxiliary feeder slide P' passing through a recessed portion 48'' in the under face of the abutment member 48. As the disk D fed by the feeder slide P is positioned substantially concentrically of the stack of disks D' in the magazine 52, 52' the auxiliary feeder slide P' will engage the lowermost disk of the stack of such disks and deliver the same from below the stack and from the magazine.

The stack of disks D' in the magazine 52, as hereinbefore stated, are suported at opposite marginal portions upon the inwardly extended marginal portions 51ᵇ of the plates 51ª which intersect the bottom of the magazine, as shown in Figure 15. To facilitate the delivery of the disks from said plates the bottom wall of the tubular portion thereof extending rearwardly from the forward wall portion to substantially the axis of the magazine is arranged of concave form, as shown at 58ª in Figure 2, and the inner edges of the plates 51ª are inclined as shown at 51ᵉ in Figures 2 and 15. As the lowermost disk of the stack of disks D' is engaged and moved by the auxiliary slide P' the forward edge of said disk D' will abut the wall of the magazine 52 causing the disk to buckle and then the leading portion of the disk to snap below the wall portion 52ª of the magazine 52 and positioning the disk D' concentrically of the disk D fed below the magazine 52 by the feeder slide P. By the continued feeding movement of the feeder slides the disk D' assembled on the disk D is yieldingly pressed against the disk D by a finger v of spring material fixed to and extending forwardly of the magazine 52, the parts being in the position shown in Figures 12 and 13. The assembled disks are then fed in successive sequence to position concentrically of the enclosing casing c for the heating element E with the disk D engaging a gauge pin 70 fixed in and extending upwardly from the heater casing c below the heat confining member or plate 55 within the hood 54, as shown in Figure 27. With the feeder slides in this position a pallet 64ª extended from and constituting an undercut portion of the pawl 64 engages a fixed stop constituting a finger 72 extended laterally from a bracket 72' fixed to the side of the depending portion 41 of the portion T of the table, as shown in Figures 12 and 13, the parts being shown in dash lines in Figure 12. By the further movement of the lever 67 to the position shown in full lines in Figure 27 by engagement of the pawl pallet 64ª with the stop 72 the pawl 64 will be moved to the dotted line position shown in said Figure 27 out of engagement with the roller 67ª, thereby releasing the feeder slides which are returned to position in engagement with the bumper 63 by the spring s. During the feeding movement of the slides P, P' as a disk D is fed from the stack of said disks the next adjacent disk D of the stack will engage the under face of the feeder slide P, and as the disk D' is fed from the magazine 52 the next adjacent disk of the stack will be supported upon the portion 51ᵇ of the plates 51ª, and this condition will be maintained during the return movement of the feeder slides until they assume their normal position shown when the uppermost disk of the stack of disks D' will be engaged with the undercut faces 48' of abutment 48 and the lowermost disk D' in the magazine supported upon the inclined faces of the inwardly extending portions 51ᵇ of the plates 51ª below the magazine, the disks being in position to be engaged and fed by the feeder slides P, P' upon the next disk feeding movement thereof. The feeder slides are returned to normal position after feeding of the assembled disks to the heating element E to permit the disks to be delivered or fed from the heating element E to the disk molding and shaping means M. As the actuating means for the feeder slides P, P' are returned to normal position the pawl 64 will engage the roller 67ª mounted on the feeder slide carrying head forwardly of said roller and the pawl will thereby be swung on its pivot 69 against the tension of spring 69', as shown in dot and dash lines at the right in Figure 27, and permit the pawl pallet 64ª to pass below the roller 67ª, and as the pawl 64 passes off from the roller 67ª the spring 69' will move the pawl to its normal position with the flat end of the reduced portion 64' of the pawl engaging the end wall of the bifurcation of the lever 65 and the pawl carrying lever 65 urged by spring 65'' to position with the pawl engaging the roller 67ª rearwardly thereof and in position to effect feeding movement of the feeder slides P, P' by the pawl upon the actuation of the lever 67.

After the assembled disks D, D' have been fed and positioned relative to the heater E and the lever 67 has been actuated to effect release of the feeder slides P, P' from the pawl 64 the disks are fed to the disk support and die S of the disk molding means M relative to the opening in said support S and in the plate F. For this purpose a feeder slide P'' is slidably mounted in slideways 74' formed by undercuts extending longitudinally of the under face of plates 74 fixed to and extending longitudinally of the top and opposite sides of the portion T of the table, the forward edge 74'' of said feeder slide also being arranged in an arc of a circle having a radius equal to the radius of the disk D. The lever 67 extends below the table portion T' and is operatively connected to the feeder plate P'' by a pin 75 fixed in and extending downwardly from the feeder plate P'' through a slot 76 in the table and engaged in a slot 75' in the lever 67, as shown in Figures 9, 15 and 27.

As the lever 67 is actuated to transmit disk feeding movement to the feeder slides P, P' the feeder plate P'' is moved simultaneously therewith through its connection 75 with the lever 67 to the position shown in Figure 27 with the disk engaging end of the plate at one side of the heating element E, and by actuating the lever 67 in a direction toward the heating element the assembled disk positioned relative to the heating element is fed and delivered to the support S relative to a container on the container support and the molding or shaping means M, and simultaneously therewith the pawl carrying arm 66 and the parts to connect the same with the lever 67 are moved to the position shown in Figure 9. The movement of the lever 67 to transmit movement to the feeder slide P'' is limited and thereby the feeding movement of said feeder slide by the lever 67 engaging a pin 76' fixed in and extending downwardly from the table portion T'.

To assure positioning and retaining the disk D' concentrically of the disk D the disk D, as shown in Figure 32, may be provided with a depression in the upper surface having a diameter substantially the same as the disk D'. However, preferably the disks are adhesively secured together sufficiently to prevent displacing of the disk D' relative to the disk D. For this purpose means are provided to apply a spot or dab of adhesive centrally of the under surface of the lowermost disk in the magazine 52 prior and preparatory to delivering such disk from the stack and assembling it on a disk D. As shown in Figures 13, 15, 16 and 17 a trough 77 to carry a liquid or semi-liquid adhesive having a laterally extending flange disposed about the open end is removably mounted on the bottom of the table portion T by means of thumb screws extended through openings in the trough flange and threaded into the table, as at 77'. The table T has an opening 78 in communication with the trough and the space between the inwardly extended portions 51$^b$ of the plates 51$^a$. To apply the adhesive from the trough to the disk a dabber in the form of an angle arm 79 is fixed on a shaft extending transversely of one end and adjacent the bottom of the trough and rotatably mounted at the ends in the opposite sides of the trough, as at 80. The free angle portion of the arm extends laterally at substantially a right angle from the arm and arranged to extend upwardly, as shown in Figure 17. The dabber in the normal position thereof engages in the adhesive in the trough and as the arm carrying shaft 80 is rocked in one direction the dabber arm is moved upwardly the laterally extending end of the dabber passing through the table opening 78 and contacting the adhesive on the end thereof against the under surface of the lowermost disk in the magazine 52. The dabber 79 is operatively connected to and actuated from the lever 67 to dab the adhesive on the disk during the period of returning the lever 67 from the position shown in Figure 27 to the position shown in Figure 9. For this purpose a lever 81 is pivotally mounted on an ear extended downwardly from a depending flange of the table T, as at 81', the one arm of the lever 81 being connected to an arm 82 fixed on the dabber carrying shaft 80 by a link 83 pivotally connected at one end to the arm 82 and the opposite end having a pin and slot connection 83' with the lever 81. To the other arm of the lever 81 there is pivotally connected an arm 84 by a pivot pin 85, the arm 84 being normally urged to position with a shoulder of said arm engaging a shoulder on the arm of lever 81, as shown at 86 in Figures 16 and 17, to limit the movement of the arm in one direction relative to the arm of the lever 81 to which it is connected by a spring 85' coiled about the extended end of the pivot pin 85 with one end of the spring fixed to the pivot pin and the opposite end engaging the arm 84. To actuate the lever 81 and link 83 from the full line to the dot and dash line position and thereby engage the dabber with the lowermost disk of the stack of disks in magazine 52 a bar 87 is slidably supported by gibs 87' fixed on the inner surface of the depending end portion of the table T, as clearly shown in Figure 17. The bar 87 carries a block 88 of V-shape form in longitudinal section on the side thereof with the V portion of the block extending downwardly. The bar 87 has a pivoted link connection 89 with the lever 67, and as the lever 67 is actuated to impart disk feeding movement to the feeder plate P'' the forward declining face of the V-block 88 engages a roller 90 carried by the arm 84 and thereby moving said arm on its pivot connection 85 with the lever 81 against the tension of spring 85' to the dotted line position 90$^a$ shown in Figure 17 without imparting movement to the lever 81 to actuate the dabber 79. As the lever 67 is operated to impart disk feeding movement to the feeder plates P, P', or moved from the position in Figure 9 to the position in Figure 27, the opposite face of the V-block 88 engages the arm roller 90 thereby moving the arm carrying said roller and as the shoulder of the arm is engaged with the shoulder of the lever, as at 86, by the spring 85' movement will be imparted to the lever 81 and the dabber actuated through the link connection 83 from the full line to the dot and dash line position shown in Figure 17 and apply a dab or spot of the adhesive to the lowermost disk D' in the magazine 52.

The disk molding or forming means shown in Figures 1, 5, 6 and 18 to 26, inclusive, are carried by a tubular member or sleeve 91 mounted to have vertical reciprocatory movement in bosses of the arms 92 of a bifurcation of a head H having a tubular portion 92' whereby it is adjustably mounted upon the top of the pedestal A, and the sleeve 91 reciprocated by a foot treadle 93 mounted on the base B connected to the sleeve 91 by a rod 93' extended through the pedestal A pivotally connected at one end to the treadle and at the opposite end to an arm 94 of a lever pivotally supported intermediate the bifurcation legs of the head H, the lever having a bifurcated arm the legs 94' of which engage at opposite sides of the tubular member or sleeve 91 and pivotally connected to a collar 95 fixed to the sleeve 91 by headed studs 95' extended through openings in the bifurcation legs 94' and threaded into the collar 95, as shown in Figure 5.

The tubular member or sleeve 91 has a bore having two diameters with the portion of less diameter at the lower end and slidably carrying therein a plunger 96 of less length than the sleeve and having two diameters corresponding with the bore in the sleeve with the portion of the plunger of less diameter of a length greater than the bore portion of less diameter of the sleeve and normally urged outwardly from the sleeve by a spring 96' confined between the plunger and a closure plug 97 (Figure 5) threaded into the top of the bore in the tubular member or sleeve 91.

The tubular member or sleeve 91 carries a plate F for the assembled disk support S to participate in the movement of the sleeve. To support and carry the plate F by the sleeve 91 a tubular head 98 is engaged upon the sleeve, the head having a portion of increased diameter forming a shoulder to engage and support the head from an annular flange extended from the end of the sleeve, as at 99, the head 98 having diametrically oppositely extending pairs of superposed perforated lugs 98' in which slidably engage rods 100 extended through openings in the plate F with a nut threaded onto the rods below the plate and a collar 101 fixed on the rods above and spaced from the plate F. The rods are normally urged upward to position the plate F in engagement with stops 102 fixed on the framework of the apparatus and extending over marginal portions of the plate by springs 103 coiled about the end of the rods above the upper lug 98' and confined by said lugs and washers abutting nuts threaded onto the ends of the rods, as clearly shown in Figure 18.

The molding and shaping means are adapted to inwardly depress the central portion of the disk D to which the disk D' is juxtaposed and simultaneously with depressing said portion of the disk engaging it into the mouth of the container or bottle C. This means as shown comprises a shaping or forming head including a block 104 detachably mounted on the end of the plunger 96. For this purpose the plunger adjacent the end is provided with an annular recess 96'' adapted to engage in a portion of least diameter of a recess in the block having two diameters and the block secured on the plunger by a split ring 105 engaged in the annular recess of the plunger and seated in the portion of larger diameter of the recess in the block and secured therein by screws, as at 106.

The block 104 carries an annular pressor plate 107 disposed about the block and adapted to engage the lip of the bottle or container C, the outer face of the pressor plate having an annular recess of arcuate form in cross section to conform to the shape of the bottle lip. The pressor plate 107 is adapted to yieldingly clamp the disk D of the closure to the bottle lip, as shown in Figures 19 and 20, for which purpose it is mounted on the block 104 by pins 108, in the present instance three in number equidistantly spaced about and fixed at one end in the plate 107. The pins 108 slidably engage a portion of reduced diameter of bores 108' in the block 104 and the plate 107 urged outwardly away from the block by springs 108ᵃ coiled about the pins in the block bores 108' of larger diameter and said movement of the plate limited by a set screw threaded into the block engaging a recess in the pins, as at 108ᵇ.

As stated, the inner surface a of the bottle mouth diverges inwardly arranging the mouth opening of progressively increasing diameter and forming with a portion of said wall inwardly thereof a recessed portion or shoulder, as at b', and the projections of the disk D' circumscribe a circle having a diameter slightly greater than the diameter of the outer portion of the wall a. In the molding or shaping of the disk D about the mouth of the bottle the assembled disks are moved downwardly with the plate F relative to the container or bottle C upon the support 40' by the downward movement of the plunger carrying sleeve 91 and the disk D engaged with the lip of the bottle mouth, and by the further downward movement of the plunger 96 with the sleeve 91 the central portion of the disk D is depressed and simultaneously engaged into the mouth of the bottle and the disk D' engaged within the depressed portion of the disk D. The peripheral projections of the disk D' circumscribing a circle having a diameter greater than the diameter of the bottle mouth at the entrance thereto as the disk D' is engaged into the bottle mouth the peripheral portion with the projections is flexed in a direction outwardly from the bottle mouth, as shown in Figure 19, the plate 107 in this position of the parts engaging and yieldingly holding the disk D to the lip of the container mouth. To cause the side wall of the depressed portion of the disk D to be firmly engaged and shaped to conform to the wall a about the bottle mouth and to seat the corner formed at the juncture of the depressed disk and the wall bounding the same in the seat b', a dished plate 109 of spring material and slitted inwardly from the periphery to provide the plate with radially extending fingers is secured by a screw 109' centrally to the end of the block 104 with an interposed member 110 of less diameter than the block and plate whereby the plate fingers extend beyond the periphery of said member 110. A series of shoes 111 are engaged in radial recesses 110' (Figure 24) spaced about the periphery of the member 110 (Figures 23 and 25) to have rocking movement outward from and toward the periphery of said member and supported by stems 112 fixed at one end in the top end of the shoes and extended through and secured in a portion of reduced diameter of bores in tubes 113, as shown in Figure 22. The tubes 113 are mounted in bores extending through and equidistantly spaced about the block 104. The upper end of the tubes 113 are inclined in an upward direction toward the axis of the block 104 and engaged by spring fingers 114 fixed to the block 104 to normally position the upper ends of the tubes and stems within the block bores and the shoes in the position shown in Figures 18 and 19. The shoes are provided with a portion 111' having a flat face at the side of the shoes opposite the transverse recess, said portion 111' extending beyond the bottom end of the shoes and adapted to engage the side wall of the depressed portion of the disk D to press it against and mold it to the shape of the wall a about the bottle mouth. The shoes are provided in the side opposite the face 111' with a transverse recess arranging the shoes with a rectangular projection 111ᵃ adapted to engage over the member 110 in an annular recess between the block 104 and member 110 formed by annular peripheral recesses in the corners at the juncture of the opposed faces and annular walls of said block and member, as at 104'. The opposite wall of the recess in the shoes is bevelled or inclined, as at 111ᵇ, adapted to engage an annular bevelled portion 110' of the member 110. By the continued downward movement of the plunger carrying sleeve 91 with the parts carried thereby from the position shown in Figure 19 the plate 107 engaging the disk D outward from the depressed portion with the lip about the bottle mouth resists further depressing movement of the disk D and is moved against the tension of the springs 108ᵃ and the spring fingers of the plate 109 will engage the disk D' opposite the annular shoulder or recess b' within the bottle neck and thus resist further movement thereof with the plunger with the result that the plate 109 is flattened and brought into firm contact with the disk D' by the member 110 and forcibly pressing the annular wall of the depressed disk portion into the recess b' at the terminattion of the diverging wall portion a about the bottle neck. Simultaneously with the flattening of the disk 109 the edge of the part 111' of the shoes is yieldingly though firmly engaged with the peripheral portion of the fingers of the plate 109 through the spring fingers 114 and thereby not only causing the peripheral projections of the disk D' to be engaged in and interlocked with the material of the disk D but also firmly impinging and molding the annular wall of the depressed portion of said disk to the wall a of the bottle mouth and provide a liquid tight seal between the closure and the bottle mouth. As the member 110 flattens the disk 109 by the engagement of said disk 109 with the shoes the shoes are rocked to engage the flat face 111' of the shoes with and firmly pressing the annular wall of the depressed portion of the disk D against the wall a about the bottle mouth, as shown in Figure 20. In this position of the parts the peripheral portion of the disk D of the closure extends outwardly over the lip of the bottle mouth and with the disk depressing and molding parts in such position means are brought into operation to form said peripheral portion of the disk D in successive sequence as a skirt about the mouth bead b of the container or bottle and to take up surplus material of the skirt to cause the same to firmly contact about the mouth lip of the bottle and form a substantially air tight seal. This means comprises a series of pairs of rollers 115 rotatably carried at the end of one arm of a series of levers 116 arranged with a circular laterally extending pivot portion 116' intermediate the ends to engage arcuate recesses 117 in and spaced about the corner formed at the juncture of the upper surface of the side of the head 98 and in opposed arcuate recesses 117' formed in the end wall of a collar 118 engaged upon the sleeve 91 and secured to the head 98 by bolts 118' and held against axial and rotative movement on the plunger carrying sleeve 91 by a set screw 118". The arms or levers 116 extend parallelly of the sleeve or tubular member 91 with the ends carrying the rollers 115 extending beyond the head 98 and curved laterally to extend inwardly below said head. The rollers 115 in the normal inactive position of the parts are caused to engage an annular member 119 of porous material impregnated with a lubricant by coiled springs 120 seated at one end in recesses 120' in the collar 118 and the opposite end engaging the other arms of the levers 116 with a tit 116' extended from said arms of the levers engaging within the coils of the springs to maintain the springs in position relative to the levers. The rollers 115 are mounted on the levers 116 to rotate in planes converging relative to a line extending radially of the sleeve or tubular member 91. For this purpose the opposite sides or faces 116ª, 116ᵇ (Figure 26) of the inwardly curved end of the levers 116 are arranged to converge in a direction toward and relative to a line extending radially of the axis of the sleeve 91. One roller is mounted on and within the head of a bushing 115ª mounted in the curved end of the lever arm to rotate on an axis extending at a right angle to the lever face 116ª and with one face of the roller contiguous to said face 116ª of the lever arm. The other roller of each pair of rollers 115 is mounted on and within the head of a stud 115ᵇ fixed in the bushing 115ª to rotate on an axis extending at a right angle to the face 116ᵇ of the lever arm with one face of the roller contiguous to the face 116ᵇ. By this arrangement of rotatably mounting the rollers 115 on the levers 116 as the plunger carrying sleeve 91 is actuated to cause the parts carried thereby to mold and shape the central portion of the disk D to depressed form within the neck of the bottle the parts will assume the position shown in Figure 19 with the rollers 115 engaging the peripheral portion of the disk D outwardly from the bottle neck in relation to pairs of slots or grooves 121 in and disposed about the top face of disk supports S. The slots of each of said pairs of slots 121, as shown in Figure 21, converge inwardly toward each other toward the axis of the support S. This engagement of the disk D in opposed relation to the slots 121 not only effects a creasing of the peripheral portion of the disk D but also yieldingly clamps the same to the support S and holding the disk in taut though somewhat yieldingly during the molding and shaping of the peripheral portion of the disk about the bead b of the bottle neck and thus assuring firm contact of the disk with the pouring lip of the bottle mouth.

After the disk depressing means have been actuated to shape the annular wall of the depressed portion about the inner face of the bottle neck continued downward movement is imparted to the sleeve or tubular member 91 relative to the plunger 96 and against the tension of the spring 96', said spring firmly holding the disk depressing parts carried by the plunger head 104 in molding position, as shown in Figure 20, and such movement of the sleeve 91 by the engagement of the pairs of rollers 115 in the pairs of slots 121 and the movement of the plate F with the disk support S relative to the neck of the bottle will cause a downward movement of the rollers 115 with the levers 116 and a rocking of the levers to move the roller carrying ends thereof simultaneously inwardly and cause the rollers to follow the curvature of the bead b about the mouth of the bottle. This movement of the rollers not only shapes the peripheral portion of the disk D to arrange the disk to cap form and curved inwardly to conform to the curvature of the bead b about the bottle mouth but effects an inward folding and forcible pressing together or crimping of the creased portions of the skirt portion and arranging said folded or crimped portions as reinforcing fins for the cap skirt extending outwardly from the cap skirt from adjacent the curved portion contacting with the lip of the bottle mouth to the edge of the disk and cap skirt and arranging the inner surface of the cap skirt as a continuous and substantially unbroken surface. Furthermore, the skirt portion is molded and shaped and the surplus portion folded under tension and thus retaining the closure under taut condition on the pouring lip about the bottle mouth.

To limit the movement of the closure forming means to closure forming position a rod 97' is screw threaded into a bore in the closure plug 97 for the bore of the sleeve 91, the rod extending into the sleeve and being of a length to be spaced from the plunger 96 a distance equal to the desired movement of the sleeve 91 to transmit skirt forming and folding or crimping movement to the levers 116, and this movement of the sleeve 91 may be varied by adjusting the rod into and out of the plug cap 97. The rod is secured in adjusted position by a lock nut threaded onto the rod exterior of the plug cap.

To assure the marginal portion of the disk D intimately contacting with and below the bead b about the mouth of the bottle or container the folding or crimping rollers 115 are provided with a circumferential groove 115c adapted by the movement of the rollers relative to the portions alternating with the fins f to inwardly fold or crimp said alternating portions and arrange said portions of the cap skirt with auxiliary outwardly projecting fins f' extending inward from the edge to an extent less than the fins f, as shown in Figure 30.

The disk D is molded and shaped about the mouth of the container while in heated and pliable condition and in order that the molded disk shall retain its molded form it is retained in molded condition by the molding and forming means for a predetermined period of time. For this purpose an alarm or signaling device is provided, shown as a bell I, together with means operative to actuate the bell striker to ring the bell, shown in Figures 5, 7 and 8. The means to actuate the bell striker is set in operation at the commencement of operation of the means to mold and shape the closure about the bottle mouth and operative after a predetermined period of time to actuate the bell striker and thus indicate to the operator of the apparatus that the molding and shaping means has been maintained in closure forming position for a period of time sufficient for the setting and hardening of the molded closure. This bell striker actuating means as shown comprises a pair of fingers 123 fixed to and extending diametrically oppositely from the periphery of a disk 124 fixed on the end of a shaft 125 journalled in the opposite walls of a housing 126. To rotate the shaft there is provided a spring 127 within and fixed at one end to the housing, the spring being coiled about and with the opposite end attached to a hollow shaft 128 rotatably mounted in the housing with one end projecting from the housing and having a ratchet wheel 129 fixed thereon. The hollow shaft is connected with the shaft 125 through a clutch 130 one member of which is fixed to the hollow shaft 128 and the other member mounted on a shaft 131 to rotate therewith and have sliding movement thereon and urged to clutching position by a spring 132 coiled about the shaft 131. The shaft 131 is operatively connected to the shaft 125 through a pinion and gear 133. To wind the spring the ratchet wheel is provided with a key engaging stud 134. The bell striker actuating means is held against operation by a spring influenced pawl engaging the ratchet wheel 129, shown as arranged on one arm of a lever 135 pivoted on the exterior of the housing with the other arm of the lever intersecting the path of movement of a pin 136 fixed at one end in the rocker arm 94 at the connection thereof with the rod connecting said rocker arm to the treadle 93 and extended laterally below said arm of the lever 135. As the treadle is depressed to actuate the rocker arm 94 to move the sleeve 91 and the closure molding means therewith downward to effect molding of the closure about the bottle mouth the pin 136 engages and actuates the pawl lever 135 to release the pawl from the ratchet wheel 129 and thereby permit rotation of the finger carrying disk 124 by the spring 127 until a disk arm 123 engages a part 137 of and trips the bell striker and effecting ringing of the bell indicating to the operator of the apparatus the molding means may be released from the formed closure.

In Figures 33 to 37, inclusive, there is illustrated a modified construction and arrangement of the means to mold or shape the disk D of the closure means to cap form about the mouth of the bottle or container having a modified arrangement of the inner surface of the wall about the mouth of the bottle or container, said wall diverging inwardly from the lip of the bottle mouth to an annular enlargement of said wall, as shown at b' in Figure 33. In the arrangement of said figures the parts are substantially the same as those shown in Figures 18, 19 and 20 except that the means to depress the central portion of the disk D and to mold and shape said depressed portion about the mouth of the bottle or container is simplified. The shoes for pressing the annular wall of the depressed portion of the disk D to the surface a of the wall about the bottle mouth, which in the arrangement of Figures 18, 19 and 20 are adapted to impinge the peripheral portion of the fingers of the resilient disk 109 to the peripheral portion of the disk D' to cause the peripheral portions of the disk D' to interlock with the material of the depressed portion of the disk D, are constructed and arranged to perform the functions of the plate 107 to yieldingly clamp the disk D to the lip of the bottle mouth and of the disk 109. Each shoe is arranged with an arcuate ear 111c extended from one side and from adjacent one end of the shoe and adapted to engage in arcuate recesses in and spaced about the block 104, and said shoe ears are retained in said recesses whereby the shoes are adapted to have pivotal rocking movement in a plane radially of the block 104 by the shoe ears engaging arcuate recesses in the member 110 secured to the block 104, as clearly shown in Figures 33, 34 and 35. Each shoe is also provided with a projection 111d in spaced relation to the arcuate ear, which projections may be of rectangular form in cross section as shown and are adapted to engage in bores 137 in the block 104 in line with and outwardly from the ear engaging recesses, each bore being arranged with a slot 137' cut through the outer wall portion of the bores and the end of the block 104 to extend radially of said block and adapted for the passage of the shoe projections 111d during the rocking movement thereof. The shoe projections 111d are normally urged outwardly from the bores 137 with a portion 111e having a flattened end of the shoes extended from intermediate the ear and projection 111d engaging the peripheral wall of the member 110, as shown in Figure 33, by springs 138 in the block bores 137. The shoes are provided with a concave face 111b in opposed relation to the projection 111d and the face of the projecting portion 111e shaped to conform to the curvature of the pouring lip of the bottle and the inwardly diverging wall of the mouth of the bottle to be positioned in opposed relation thereto during the molding and shaping of the closure disk D about the pouring lip of the bottle mouth, as shown in Figure 35.

In operation as the plunger 96 with the parts carried thereby is moved by the sleeve 91 downwardly toward the bottle or container on the support 40' as hereinbefore described the member 110 with the projecting portions 111e of the shoes which circumscribe a circle having a diameter slightly less than the diameter of the disk D' engage said disk and depresses the juxtaposed portion of the disk D into the mouth of the bottle, and as the disk D' is of a diameter somewhat greater than the diameter of the bottle mouth at the entrance thereto the peripheral wall of said disk with the projections is flexed outwardly to permit of the passage of the disk into the bottle mouth. During the continued downward movement of the parts in successive sequence the upper portion of the concave face 111ᵇ of the shoes is brought into yielding engagement with the pouring lip of the bottle mouth resisting the further downward movement of the shoes with the plunger head and rocking the shoes and engaging the portion of the concave face of the shoes opposite the projections engaging the peripheral wall of the member 110 with the peripheral wall of the depressed disk portion and forcibly pressing said disk portion against the inwardly diverging face of the wall about the bottle mouth and causing the flattened ends of the shoe projections 111ᵉ to flatten the peripheral portion of the plug disk D' and interlocking the peripheral projections of said disk with the material of the disk D, thus providing a liquid tight seal between the depressed portion of the disk D and the bottle mouth. During this movement of the plunger 96 the sleeve 91 has moved the rollers 115 into engagement with the peripheral portion of the disk D outward from the depressed portion of the disk against the grooved surface of the disk support S and creasing the same. By the further downward movement of the roller carrying levers 116 with the sleeve 91 the rollers are moved relative to and caused to forcibly press the disk D about the mouth bead b through the action of the springs 120 effecting folding of the skirt portion of the closure disk D to arrange the same with the fins f, f' and intimately engaging the formed skirt portion of the closure with the mouth bead b. After the closure disk D has been molded and shaped about the mouth of the bottle or container it is retained in such position by the molding and shaping means for a predetermined period of time indicated by the indicating means I to effect a setting of the material of the closure parts. By the provision of the lubricant impregnated member 119 sufficient lubricant will be applied to the rollers 115 to effect a ready rolling of the rollers relative to the disk D during the shaping of the peripheral portion thereof to skirt form and the folding of the surplus material of the skirt to outwardly extending fin form.

It will be obvious that various modifications may be made in the construction and arrangement of the parts without departing from the scope of the invention, and that portions of the invention may be used without others and come within the scope of the invention.

Having described my invention, I claim:

1. In means to apply a combined cap and disk plug sealing closure to containers including a pair of juxtaposed disks of different diameters, one disk having a diameter greater than the diameter of the container mouth and the property of being relatively rigid at atmospheric temperature and to be rendered pliable and moldable when heated and the other disk to constitute the plug superposed thereto being of relatively stiff material and of a diameter to engage in the container mouth, a container support, means reciprocatory toward and away from the container on the container support including a sleeve, a plate carried by the sleeve and extending transversely of one end thereof and having an opening to support the superposed disks in heated condition concentrically of the opening with the disk of smaller diameter superposed to the disk of larger diameter, and said plate by the movement thereof toward the container positioning the disk on the mouth of the container, means carried by and participating in the movement of the sleeve operative by the movement thereof toward the container to depress the central portion of the one disk with the juxtaposed disk into the container mouth and yieldingly clamp the disk of larger diameter to the lip of the container mouth, shape the depressed portion to the inner surface of the wall about the container mouth and impinge the peripheral portion of the small disk against the side wall of the depressed portion, means carried by the sleeve adapted to co-operate with the plate during the movement thereof relative to the container to arrange the portion of the disk outwardly from the depressed portion to skirt form and simultaneously fold successive portions thereof upon themselves with the folds extending from adjacent the portion of the disk engaging the lip of the container mouth to the edge of the disk and portions of the skirt alternating with the folded portions and said second folds being of less length than the first folds to displace surplus material of the skirt and shape the skirt to conform to and intimately contact the wall about the container mouth.

2. In means to shape a disk of the character specified to closure cap form upon the mouth of a container, a pedestal, a container support adjustably mounted on the pedestal, a head adjustably mounted on the pedestal, a sleeve slidably carried by the head to have reciprocatory movement toward and away from the container support, a disk supporting plate extending transversely of the end of the sleeve slidably carried by the sleeve to participate in the movement of and have movement relative to the sleeve and normally urged to predetermined position from the end of the sleeve, said plate having an opening of less diameter than the disk for engagement of the mouth end of the container by the movement of the plate with the sleeve toward the container on the container support and position the disk supported concentrically of said opening upon the lip of the container mouth, and means carried by the sleeve to participate in the movement thereof and permit the sleeve to move relative thereto operative in successive sequence to, depress the central portion of the disk into the container mouth, yieldingly clamp the disk to the lip of the container mouth and shape the side wall of the depressed portion to the inner surface of the wall about the container mouth, and means carried by and movable with the sleeve adapted to engage the peripheral portion of the disk supporting plate and cooperate with said plate to shape the peripheral portion of the disk to skirt form about the container mouth and simultaneously progressively fold successive portions thereof upon themselves to shape the skirt to and intimately contact the portions of the skirt alternating with the folded portions to the wall about the container mouth.

3. In means to shape a disk of the character specified to closure cap form upon the mouth of a container, a container support, a sleeve reciprocatory toward and away from the container support, a disk supporting plate extending transversely of the end of the sleeve slidably carried by the sleeve to participate in the movement of and have movement relative to the sleeve and normally urged to predetermined position toward the end of the sleeve, said plate having an opening concentrically of the sleeve adapted for engagement of the mouth end of the container by the movement of the plate with the sleeve toward the container on the support and support the disk concentrically of the opening, a plunger slidably carried by the sleeve to participate in the movement of the sleeve and permit movement of the sleeve relative thereto, said plunger carrying a head adapted to engage the disk on the plate and depress the central portion thereof through the plate opening into the container mouth, means carried by the plunger head to engage the disk on the container mouth to yieldingly arrest the depressing of the disk, means carried by the plunger to shape the depressed disk portion to the inner surface of the wall about the container mouth, and means carried by the sleeve to have movement on an axis extending transversely of the sleeve and participating in the movement of the sleeve and normally urged to predetermined position toward the axis of the sleeve, said means being adapted to engage the peripheral portion of the disk on and co-operate with the disk supporting plate in the movement thereof toward the container to arrange the portion of the disk outward from the depressed portion to skirt form and fold successive portions of the skirt upon themselves with the folds extending from adjacent the portion of the disk engaging the lip of the container mouth to the edge of the skirt and fold portions of the skirt alternating with the first folds and said folds being of less length than the first folds to shape the skirt to conform to and intimately contact the wall about the container mouth.

4. In means to shape a disk to closure cap form upon the mouth of a container as claimed in claim 2, wherein the means carried by the plunger head to shape the depressed portion to the inner surface of the wall about the container mouth comprises shoes spaced about and carried by the plunger head to have rocking movement radially of the head and normally yieldingly urged toward the head, and said shoes by the disk depressing movement of the plunger head actuated to press the depressed disk portion to the wall about the container mouth.

5. Means to shape a disk to closure cap form upon the mouth of a container as claimed in claim 2, wherein the means to yieldingly arrest the depressing of the disk and to shape the depressed portion to the wall about the container mouth, comprises an annular member carried by the plunger head concentrically thereof to have yielding movement away from and toward the plunger head and urged to predetermined position outwardly from the plunger head and adapted to engage the disk upon the container mouth, and shoes spaced about and carried by the plunger head to have rocking movement radially of the head and normally yieldingly urged toward the head and operative by the plunger head in successive sequence to the disk depressing action thereof outwardly from the plunger head to press the depressed portion of the disk to the wall of the container mouth by the engagement of the shoes with the depressed end portion of the disk.

6. Means to shape a disk to closure cap form upon the mouth of a container as claimed in claim 2, wherein the means to yieldingly arrest the depressing of the disk and to shape the depressed portion to the wall of the container mouth, comprises an annular member carried by the plunger head concentrically thereof to have yielding movement toward and away from said head and urged to predetermined position outwardly from the head and yieldingly engage the disk upon the container mouth, a dished plate of resilient material arranged with radial fingers secured concentrically to the end of the plunger head and having a diameter less than the depressed portion of the disk and adapted to be flattened by the plunger head in successive sequence to the arresting of the depressing of the disk and impinge the annular wall of the depressed portion of the disk to the wall about the container mouth, and shoes spaced about and carried by the head within the peripheral portion of the dished plate to have rocking movement radially of the plunger head and shape the annular wall of the depressed portion of the disk to conform to the wall about the container mouth.

7. Means to shape a disk to closure cap form upon a container mouth as claimed in claim 2, wherein the plunger head has a portion at the end of reduced diameter adapted to engage and depress the central portion of the disk into the container mouth, and the means to yieldingly arrest depressing of the disk and to shape the depressed portion of the disk to the wall of the container mouth, comprises an annular member carried by and disposed about the portion of reduced diameter of the plunger head to have yielding movement toward and outward from said head and urged to predetermined position outwardly from the plunger head and adapted to yieldingly engage the disk upon the container mouth to arrest the depressing of the disk, a dished plate of resilient material arranged with radial fingers secured concentrically to the end of the head and of a diameter greater than the portion of the plunger head of reduced diameter and of a diameter less than the depressed portion of the disk and adapted to be flattened by the plunger head in successive sequence to the arresting of the depressing of the disk and impinge the annular wall of the depressed portion to the wall about the container mouth, shoes spaced about the portion of the plunger head of reduced diameter within the peripheral portion of the dished plate to have radial rocking movement, a stem fixed at one end in each shoe and extended through the plunger head, and spring fingers carried by the plunger head to engage the shoe stems and urge the shoes toward the plunger head, and said shoes by the flattening movement of the dished plate adapted to be rocked outwardly from the plunger head and shape the annular wall of the depressed portion of the disk to the wall about the container mouth.

8. Means to shape a disk to closure cap form upon a container mouth as claimed in claim 2, wherein the means to yieldingly arrest the depressing of the disk and to shape the depressed portion of the disk to the wall about the container mouth, comprises shoes disposed about and carried by the plunger head to have rocking movement radially of the plunger head and normally urged toward said head, said shoes having an arcuate face conforming to the lip of the container mouth and adapted to engage the disk upon the lip of the container mouth and thereby actuate the shoes by the movement of the plunger head to press the depressed portion of the disk to the wall about the container mouth.

9. Means to shape a disk to closure cap form upon a container mouth as claimed in claim 3, wherein the disk supporting plate is provided with grooves spaced about and extending toward the opening in the plate, and the means to arrange the disk outwardly from the depressed portion to skirt form and fold successive portions upon themselves and shape the portions of the skirt alternating with the folds to conform to and intimately contact the skirt with the wall about the container mouth, comprises levers spaced about and pivotally supported intermediate the ends by the sleeve to extend longitudinally thereof with an arm of the levers extended below the sleeve and carrying rollers, springs co-operating with the other arm of the levers to urge the levers independently in a direction to engage the rollers carried thereby with the plunger head and adapted to be engaged with the disk upon the supporting plate in opposed relation to the grooves in the plate and crease the peripheral portion of the disk and the rollers co-operating with the plate and grooves therein by the movement of the sleeve toward the container support to arrange the peripheral portion of the disk to skirt form and fold progressively the outwardly extending creased portions upon themselves and shape the portions of the skirt alternating with the folds to conform to and intimately contact the wall about the container mouth.

10. In means to shape a disk of the character specified to closure cap form upon a container mouth, a container support, a sleeve reciprocatory toward and away from the container support, a plate extending transversely of the end of and slidably carried by the sleeve, said plate being normally urged to predetermined position toward the end of the sleeve and having an opening of a diameter less than the diameter of and adapted to support the disk concentrically of the opening and having grooves in the face of and spaced about the opening therein and extending in a direction toward the axis of and through the wall of the opening in the plate and said plate by the movement thereof with the sleeve engaging and moved relative to the mouth end of the container to position a disk thereon on the lip of the container mouth, a plunger slidably carried by said sleeve to participate in the movement thereof and permit of movement of the sleeve relative to the plunger and normally urged to position with one end extending from the sleeve, said plunger carrying a head on the end extending from the sleeve to depress the portion of the disk relative to the plate opening into the container mouth, means to shape the depressed portion to conform to the inner surface of the wall and the lip of the container mouth, levers spaced about and pivotally carried intermediate the ends by the sleeve to extend longitudinally thereof with one arm extended below the sleeve, rollers carried by said lever arms extended below the sleeve, springs co-operating with the other arm of the lever to yieldingly urge the levers independently in a direction to engage the rollers with the plunger head and adapted to engage the peripheral portion of the disk in opposed relation on the grooved portion of the plate and crease the same and adapted to co-operate with the plate by the movement of the sleeve to arrange the peripheral portion of the disk to skirt form and simultaneously fold successive portions of the disk inwardly upon themselves to displace surplus material of the portions of the skirt alternating with the folds and shape the skirt to conform to and intimately contact the wall about the container mouth.

11. Means to shape a disk of the character specified to closure cap form upon a container mouth as claimed in claim 10, wherein the grooves in the face of the disk supporting plate are arranged in pairs with the grooves of each pair of grooves converging toward each other in a direction toward the axis of the opening in the plate, and a pair of rollers are carried by each lever arm to rotate in planes converging inwardly toward each other and in the plane of the converging grooves in the plate and the surplus material of the cap skirt folded and pressed together between each pair of rollers.

12. Means to shape a disk of the character specified to closure cap form upon the mouth of a container as claimed in claim 10, wherein the grooves in the face of the disk supporting plate are arranged in pairs with the grooves of each pair of grooves converging toward each other in a direction toward the axis of the opening in the plate, and a pair of rollers are carried by each lever arm to rotate in planes converging toward each other and in the planes of the converging grooves in the plate and the surplus material of the skirt folded and pressed together between each pair of rollers, and each roller arranged with a circumferential groove adapted to effect folding of the material of the portions of the skirt alternating with the portions folded between the rollers.

13. In means to shape a disk of the character specified to closure cap form upon a container mouth as claimed in claim 10, an annular member of porous material impregnated with lubricant disposed about the plunger head with which the lever rollers are adapted to engage in the normal position thereof and apply lubricant to the circumferential surface of the rollers.

14. The method of applying a sealing closure to the mouth of a container, which comprises providing a pair of juxtaposed concentrically assembled disks of different diameters, one disk having a diameter slightly greater than the diameter of the entrance to the opening in the container mouth and the other disk having a diameter greater than the container mouth and having the property of being substantially rigid at atmospheric temperature and rendered pliable and moldable when heated, subjecting the disks to an elevated temperature to render the one disk pliable, depressing the central portion of the disk of larger diameter in pliable condition into the mouth of the container and simultaneously the disk of smaller diameter within such depressed disk portion flexing the peripheral portion of said smaller disk outwardly of the container mouth, molding the side wall of the depressed portion to the inner surface of the wall about the container mouth, and flattening the peripheral portion of the disk of smaller diameter and impinging the side wall of the depressed portion of the other disk to the wall about the container mouth and then in successive sequence while holding the depressed portion of the disk to the container molding the peripheral portion of the pliable disk outwardly of the depressed portion over the lip of the container mouth to skirt form and simultaneously fold successive portions upon themselves to take up surplus material thereof and shape the same to conform to and intimately contact the wall of the container about the mouth.

15. The method of applying sealing closures to the mouth of a container, which comprises providing a pair of disks of different diameters, one disk having a diameter greater than the container mouth and the property of being substantially rigid at atmospheric temperature and adapted to be rendered pliable and moldable when heated and the other disk being substantially stiff and having a diameter substantially equal to the diameter of the mouth opening of the container, assembling the disk of smaller diameter in superposed concentric relation to the disk of larger diameter, subjecting the disks to an elevated temperature to render the one disk pliable, depressing the central portion of the pliable disk into the mouth of the container with the disk of smaller diameter uppermost and engaged within the depressed portion of the other disk, molding the side wall of the depressed portion to the inner surface of the wall about the container mouth, and then while holding the depressed portion of the disk to the container in successive sequence mold the peripheral portion of the disk of pliable material over the lip of the container mouth to skirt form about the wall of the container mouth and simultaneously therewith fold successive portions thereof upon themselves and shape the portions alternating with the folds to conform to and intimately contact the same with the wall about the container mouth.

16. The method of applying sealing closures to a container mouth as claimed in claim 15, wherein the wall about the mouth opening of the container diverges inwardly, and the disk of smaller diameter is provided with peripheral projections circumscribing a circle having a diameter greater than the diameter of the opening in the container mouth, and as said disk is engaged in the depressed portion of the other disk within the container mouth flexing the peripheral projections outwardly from the container mouth and in successive sequence molding the side wall of the depressed portion to and prior to the inner surface of the wall about the container mouth flattening the peripheral portion of said disk and interlocking the peripheral projections with the depressed portion of the other disk.

17. The method of applying a sealing closure to the mouth of a container having a mouth opening the wall of which diverges inwardly, which comprises providing a pair of disks of different diameters, one disk having a diameter greater than the container mouth and the property of being substantially rigid at atmospheric temperature and adapted to be rendered pliable and moldable when heated, and the other disk having a diameter greater than the entrance to the opening in the container mouth, assembling the disk of smaller diameter in concentric superposed relation to the other disk, subjecting the disks to an elevated temperature to render the one disk pliable and moldable, depressing the central portion of the pliable disk with the other disk juxtaposed thereto in the mouth of the container and flexing the peripheral portion of the disk of smaller diameter outwardly from the container mouth, flattening the disk of smaller diameter to impinge the side wall of the depressed portion to the wall about the container mouth and moulding the side wall of the depressed portion to the inner surface of the wall about the container mouth, and then moulding the portion of the one disk outwardly from the depressed portion over the lip of the container mouth and to skirt form about the wall of the container mouth and simultaneously fold portions thereof upon themselves and shape the portions alternating with the folded portions to the wall about the container mouth.

18. The method of applying and sealing a closure to the mouth of a container having a neck, the wall of the opening in which neck diverges inwardly, which comprises providing a pair of disks of different diameters, one disk having a diameter greater than the container neck and the property of being substantially rigid at atmospheric temperature and adapted to be rendered pliable and moldable when heated, and the other disk of relative-stiff material arranged with peripheral projections circumscribing a circle having a diameter greater than the diameter of the neck opening at the entrance thereof, assembling the disk of smaller diameter in superposed concentric relation to the other disk, subjecting the disks to an elevated temperature to render the one disk pliable and moldable, and then in successive sequence depress the central portion of the pliable disk with the disk of smaller diameter into the container neck and flex the peripheral projections of the one disk outwardly by the passage of the same into the container neck, flatten the peripheral projections of the disk and interlock the same with and impinge the material of the side wall of the depressed portion of the other disk against the wall about the neck opening, and then mold the portion of the pliable disk outwardly from the depressed portion over the lip of and about the neck to skirt form and simultaneously fold portions thereof upon themselves and shape the portions alternating with the folded portions to conform to and intimately contact the wall of the container neck.

19. In apparatus for applying a combined sealing cap and plug disk closure to the mouth of a container including a disk having the property of being substantially rigid at atmospheric temperature and rendered pliable and moldable when heated, a table arranged with a slideway, a carrier for a stack of disks of pliable material normally positioning the disk at the end of the stack in the plane of the slideway, a magazine for a stack of the plug disks having a diameter less than the moldable disks and supported above the slideway in spaced and alined relation to the carrier for stack of moldable disks and arranged with means to support the stack of disks with the lowermost disk above the slideway, heating means in spaced and alined relation to the magazine including a hot plate to receive a disk arranged in the plane of the slideway, means to successively feed the end disk from the stack of moldable disks, the lowermost disk from the stack in the magazine and assemble said disk in superposed concentric relation to the disk fed from the stack of moldable disks and feed the assembled disks to the hot plate of the heating means, and means in spaced and alined relation to the heating means including a support for and to receive disks from the heating means operative to mold the one disk to cap form upon the container mouth with the central portion thereof with the superposed disk depressed into the container mouth.

20. In apparatus for applying a combined sealing cap and plug disk closure to a container mouth as claimed in claim 19, an adhesive carrying trough disposed below the magazine for the stack of plug disks, and means connected to and operative from the feeding means for said disk to apply adhesive from the trough to the lowermost disk of said stack of disks in the magazine.

21. Apparatus for applying a combined sealing cap and plug disk closure to a container mouth as claimed in claim 19, wherein the disk feeding means comprises a feeder slide slidable in the slideway to feed the disks from the stack of moldable disks, and an auxiliary feeder slide to feed the lowermost disk from the stack of disks in the magazine fixed upon and projecting forwardly from the first feeder slide.

22. In apparatus for applying a combined sealing cap and plug disk closure to a container mouth as claimed in claim 19, a head fixed to and carrying the first feeder slide, springs to yieldingly urge said head with the feeder slides in non-feeding direction to predetermined position of rest, and means co-operating with the feeder slide carrying head to impart feeding movement to said head and the slides against the action of the springs and adapted to be released from the head at the termination of the disk feeding movement of the feeder slides and permit the feeder slides to be moved in non-feeding direction to predetermined position of rest by the springs.

23. In apparatus for applying a combined sealing cap and plug disk closure to a container mouth as claimed in claim 19, a head fixed to and carrying the first feeder slide, springs to yieldingly urge said head with the feeder slides in non-feeding direction to predetermined position of rest, and means co-operating with the feeder slide carrying head to impart feeding movement to said head and the feeder slides against the action of the springs and adapted to be released from said head at the termination of the disk feeding movement of the feeder slides and permit the feeder slides to be moved in non-feeding direction by the springs to predetermined position of rest, comprising an arm pivotally mounted at one end, a lever pivotally carried at the free end of said arm and normally urged to position to extend in the direction of and outward from the arm, a pawl pivotally carried by one arm of the lever and normally urged to position to extend in the direction of and outward from said lever arm and said pawl adapted to engage rearwardly of a roller carried by the slide carrying head and impart disk feeding movement to the feeder slide carrying head by the movement of the arm in one direction, and said pawl having a pallet adapted to engage a fixed stop at the termination of the disk feeding movement of the feeder slide carrying head and actuate the pawl out of engagement with said roller and permit the feeder slide carrying head with the feeder slides to be moved in non-feeding direction by the springs, and said pawl upon the return movement thereof with the lever carrying arm adapted to engage the head roller forward thereof and thereby move the pawl on its pivotal connection with the lever arm out of engagement with and permit it to assume position in the rear of said roller.

24. In apparatus for applying a combined sealing cap and plug disk closure to the mouth of a container including a disk of a diameter greater than the plug disk having the property of being substantially rigid at atmospheric temperature and adapted to be rendered pliable and moldable when heated, a table arranged with a slideway, a carrier for a stack of the disks of moldable material below the slideway of the table normally urged upwardly to position the uppermost disk of the stack in the plane of the slideway, a magazine for a stack of the plug disks above the slideway in spaced and alined relation to the carrier for the stack of moldable disks and arranged with a support to support the lowermost disk of the stack above the slideway, a heating element in spaced and alined relation to the magazine including a hot plate arranged in the plane of the slideway, a feeder slide slidable in the slideway and operative to successively feed disks from the stack of moldable disks, an auxiliary feeder slide fixed in superposed relation to and extending forwardly of the first feeder slide to feed disks from the magazine and assemble said disks in superposed concentric relation to the disks fed from the stack of moldable disks and feed the assembled disks to the heating element, a second slideway in the table arranged at one side of and in the plane of the hot plate of the heating element and extending in angular relation to the first slideway, means in spaced alinement to the heating element at the side thereof opposite the second slideway arranged with a support for and adapted to receive heated disks from the heating element and operative to mold the moldable disks to cap form upon the mouth of the container with a central portion thereof depressed with the plug disk therein into the mouth of the container, a second feeder slide slidable in the second slideway operative to feed the assembled disks from the heating element to the molding means, and means operative to alternately impart feeding movement to the feeder slides.

25. In apparatus for applying a combined sealing cap and plug disk closure to the mouth of a container as claimed in claim 24, springs to move the first feeder slides in non-feeding direction to predetermined position of rest, and means connected to the second slide and adapted to be operatively connected with the first feeder slides operative to actuate the first feeder slides in disk feeding direction and simultaneously actuate the second feeder slide in non-feeding direction, and said means adapted to be released from the first feeder slide at the termination of the disk feeding movement thereof and permit said feeder slide to be returned to predetermined position of rest by the springs, and then operative to impart disk feeding movement to the second feeder slide and position the same for connection with the first feeder slide.

26. In means to apply a combined sealing cap and plug disk closure to the mouth of a container as claimed in claim 24, springs to return the first feeder slide to normal position of rest, and the means to actuate the feeder slides adapted to be releasably connected to the first feeder slide and transmit feeding movement thereto by the movement of said means in one direction and release said means from said first slide at the termination of the disk feeding movement thereof, and a lever connected to the second slide and the actuating means for the first feeder slide operative to move said actuating means in feeding and non-feeding directions and transmit feeding and non-feeding movement to the second slide.

27. In apparatus to apply a combined sealing cap and plug disk closure to the mouth of a container as claimed in claim 24, an adhesive carrying trough below the magazine, means to apply adhesive from the trough to the lowermost disk of the stack of disks in the magazine, and means to operatively connect said adhesive applying means to the actuating means to transmit disk feeding movement to the feeder slides and actuate the adhesive applying means during the operation of said means to transmit disk feeding movement to the first slide.

28. In apparatus for applying a combined cap and plug disk closure to the mouth of a container as claimed in claim 24, an adhesive carrying trough below the magazine, a dabber pivotally mounted in the trough operative to apply a dab of the adhesive from the trough to the lowermost disk of the stack of disks in the magazine, a bar supported to have longitudinal reciprocatory movement pivotally connected to and reciprocated from the actuating means for the feeder slides and having a cam fixed to a side thereof, a lever connected at one arm thereof to the dabber and pivotally carrying a roller by the other arm normally urged to predetermined position from the lever arm and positioned in the path of movement of the bar cam, and said roller adapted to be engaged by the bar cam by the movement of the bar in one direction and actuate the lever to impart movement to the dabber to apply a dab of adhesive to the lowermost disk in the magazine, and the roller adapted to be rocked on its pivot connection with the lever arm by the engagement of the bar cam therewith in the movement of the bar in the opposite direction.

29. Apparatus for applying a combined sealing cap and plug disk closure to the mouth of a container as claimed in claim 19, wherein the magazine includes a tubular member having the lower wall arranged to concave form extending from the forward portion of the tubular member to substantially the axis thereof, and the support for the stack of disks extends inwardly from opposite sides of the tubular member and terminate at opposite sides of the axis of the tubular member and having the upper surface beveled relative to the concave portion of the end wall of the tubular member whereby the lowermost disk of the stack as it is engaged by the feeder slide is adapted to be buckled and in successive sequence to the buckling thereof the forward portion of the disk snapped below the tubular member and delivered from the magazine.

30. In apparatus for applying a combined sealing cap and disk plug closure to the mouth of a container as claimed in claim 19, a hood disposed above the heating means, and a plate slidably carried within the hood and urged to predetermined spaced relation to the hot plate of the heating means to prevent dissipation of the heat.

31. Apparatus for applying a combined sealing cap and plug disk closure to the mouth of a container as claimed in claim 24, wherein the carrier for the stack of disks below the table is slidably mounted on posts extended below the table, and the carrier with the disks is urged upwardly by springs coiled about the posts below the carrier, and one of said posts having a pivotal section adapted to be releasably retained in position to retain the disks stacked on the carrier and adapted to be moved laterally of the carrier to facilitate stacking the disks on the carrier.

32. In apparatus for applying a combined sealing cap and plug disk closure to the mouth of a container as claimed in claim 24, an abutment mounted on the table above the stack of disks below the table having undercut face portions in opposed relation to and spaced from the slideway a distance substantially equal the thickness of a disk and adapted for the engagement of the uppermost disk of the stack and passage of the first feeder slide, and said abutment having a second undercut portion intermediate the first undercut portions spaced from the slideway a distance equal to the thickness of the first and auxiliary feeder slides and adapted for the passage of the auxiliary feeder slide.

33. In means to mold and shape a disk to closure cap form upon the mouth of a container, a container support, means superposed to the container support to have reciprocatory movement toward and away from the container support and operative by the movement thereof toward the container support to engage a disk upon the mouth of and mould the same to cap form upon the container mouth and adapted to be retained in molding position to permit setting of the molded disk, means to reciprocate said molding means, signalling means, actuating means for the signalling means, means to releasably hold the actuating means inactive, and the actuating means when released adapted to actuate the signalling means after a predetermined period of time, and means carried by the means to reciprocate the molding means operative when said means is actuated to move the molding means to molding position to release the holding means from the actuating means for the signalling means and permit operation of said actuating means to operate the signalling means after a predetermined period of time.

34. Means to mold and shape a disk to closure cap form upon the mouth of a container as claimed in claim 33, wherein the signalling means comprises a bell and a bell striker therefor, and the actuating means is adapted to actuate the bell striker.

35. In apparatus for moulding a disk of the character specified upon the mouth of a container, a slideway, a carrier for a stack of disks supported by the slideway and adapted to position the end disk of the stack in the slideway, a slide to feed the end disk from the stack, a second slideway arranged with an electrically heated hot plate, a container support below said latter slideway in spaced relation to the hot plate, a disk supporting plate having an opening supported relative to the second slide to have movement toward and away from the container support, means disposed above and to have movement relative to said disk supporting plate and cooperate therewith to mould a disk on said supporting plate to cap form upon the container, a slide to deliver a disk from the hot plate to said disk supporting plate, and means to actuate said slides in sequence to feed a disk from the disk carrier to the hot plate and a disk from the hot plate to the disk supporting plate above the container support.

36. The method of forming and sealing closures to the mouth of containers, which comprises providing a disk of a diameter greater than the diameter of the container mouth having the property of being substantially rigid at atmospheric temperature and adapted to be rendered pliable and mouldable when heated, subjecting the disk to an elevated temperature to render the disk pliable, depressing the central portion of the heated disk into the mouth of the container, moulding the disk outwardly from said depressed portion into intimate engagement with the inner surface and lip of the container mouth, and then in successive sequence while holding said moulded portion in engagement with the inner surface and lip of the container mouth shaping the peripheral portion of the disk to skirt form about the container and simultaneously progressively folding surplus portions of the skirt upon themselves and moulding the portions alternating with said folded portions to conform to the container wall and folding surplus material of said alternating portions upon itself and intimately contact the same with the container.

PHILIP MANCUSO.